US005084367A

United States Patent [19]

Kato et al.

[11] Patent Number: 5,084,367

[45] Date of Patent: Jan. 28, 1992

[54] ELECTROPHOTOGRAPHIC PHOTORECEPTOR

[75] Inventors: Eiichi Kato; Kazuo Ishii, both of Shizuoka, Japan

[73] Assignee: Fuji Photo Film Co., Ltd., Kanagawa, Japan

[21] Appl. No.: 384,540

[22] Filed: Jul. 25, 1989

[30] Foreign Application Priority Data

Jul. 25, 1988 [JP] Japan ........ 63-183701
Aug. 1, 1988 [JP] Japan ........ 63-190525
Sep. 5, 1988 [JP] Japan ........ 63-220442

[51] Int. Cl.$^5$ ........ G03G 5/00; C08F 18/16; C08F 20/10; C08F 118/16

[52] U.S. Cl. ........ 430/96; 526/326

[58] Field of Search ........ 430/96, 90; 526/336, 526/326, 326

[56] References Cited

U.S. PATENT DOCUMENTS

| | | | |
|---|---|---|---|
| 3,595,647 | 7/1971 | Yasumori et al. | 96/1 |
| 3,885,961 | 5/1975 | Kimura et al. | 430/96 |
| 4,105,448 | 8/1978 | Miyatuka et al. | 96/1 |
| 4,434,218 | 2/1984 | Tarumi et al. | 430/96 |
| 4,500,622 | 2/1985 | Horie et al. | 430/96 |
| 4,749,981 | 7/1988 | Yui et al. | 338/225 |
| 4,818,654 | 4/1989 | Hiro et al. | 430/59 |
| 4,871,638 | 10/1989 | Kato et al. | 430/96 |
| 4,929,527 | 5/1990 | Kato et al. | 430/95 |
| 4,952,475 | 8/1990 | Kato et al. | 430/49 |
| 4,954,407 | 9/1990 | Kato et al. | 430/96 |

FOREIGN PATENT DOCUMENTS

| | | | |
|---|---|---|---|
| 0768289 | 3/1971 | Belgium | 430/96 |
| 1806414 | 8/1969 | Fed. Rep. of Germany . | |
| 2537581 | 3/1976 | Fed. Rep. of Germany . | |
| 0217501 | 12/1983 | Japan . | |
| 1293211 | 12/1986 | Japan | 526/326 |

*Primary Examiner*—Marion E. McCamish
*Assistant Examiner*—S. Crossan
*Attorney, Agent, or Firm*—Sughrue, Mion, Zinn, Macpeak & Seas

[57] ABSTRACT

An electrophotographic photoreceptor comprising a support having provided thereon at least one photoconductive layer containing at least inorganic photoconductive particles and a binder resin is disclosed, wherein said binder resin comprises (A) at least one resin having a weight average molecular weight of from $1\times10^3$ to $2\times10^4$ and containing at least one polar group selected from $—PO_3H_2$, $—SO_3H$, —COOH,

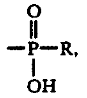

wherein R represents a hydrocarbon group or —OR'; and R' represents a hydrocarbon group, and a cyclic acid anhydride-containing group, and (B) at least one resin having a weight average molecular weight of $5\times10^4$ or more and containing a crosslinked structure. The photoreceptor exhibits excellent electrostatic characteristics, image forming performance as well as printing suitability irrespective of change in environmental condition or the kind of sensitizing dyes to be used in combination with the photoreceptor.

10 Claims, No Drawings

ELECTROPHOTOGRAPHIC PHOTORECEPTOR

FIELD OF THE INVENTION

This invention relates to an electrophotographic photoreceptor, and more particularly to an electrophotographic photoreceptor excellent in electrostatic characteristics and moisture resistance, and especially performance properties as a CPC photoreceptor.

BACKGROUND OF THE INVENTION

An electrophotographic photoreceptor may have various structures in agreement with prescribed characteristics or electrophotographic processes applied.

Widely employed among them is a system in which a photoreceptor comprises a support having provided thereon at least one photoconductive layer and, if necessary, an insulating layer on the surface thereof. The photoreceptor composed of a support and at least one photoconductive layer is subjected to ordinary electrophotographic processing for image formation including charging, imagewise exposure, development and, if necessary, transfer.

Electrophotographic photoreceptors have also been used widely as offset printing plate precursor for direct printing plate making. In particular, a direct electrophotographic lithographic printing system has recently been acquiring a greater importance as a system providing hundreds to thousands of prints of high image quality.

Binders to be used in the photoconductive layer should themselves have film-forming properties and capability of dispersing photoconductive particles therein, and, when formulated into a photoconductive layer, binders should exhibit satisfactory adhesion to a support. They are also required to bear various electrostatic characteristics and image-forming properties, such that the photoconductive layer may exhibit excellent electrostatic capacity, small dark decay and large light decay, hardly undergo fatigue before exposure, and stably maintain these characteristics against change of humidity at the time of image formation.

Binder resins which have been conventionally used include silicone resins (see JP-B-34-6670, the term "JP-B" as used herein means an "examined published Japanese patent application"), styrene-butadiene resins (see JP-B-35-1960), alkyd resins, maleic acid resins and polyamides (see Japanese JP-B-35-11219), vinyl acetate resins (see JP-B-41-2425), vinyl acetate copolymer resins (see JP-B-41-2426), acrylic resins (see JP-B-35-11216), acrylic ester copolymer resins (see JP-B-35-11219, JP-B-36-8510, and JP-B-41-13946), etc. However, electrophotographic photosensitive materials using these known resins suffer from any of disadvantages, such as poor affinity for photoconductive particles (poor dispersion of a photoconductive coating composition); low charging properties of the photoconductive layer; poor quality of a reproduced image, particularly dot reproducibility or resolving power; susceptibility of reproduced image quality to influences from the environment at the time of electrophotographic image formation, such as a high temperature and high humidity condition or a low temperature and low humidity condition; and insufficient film strength or adhesion of the photoconductive layer, which causes, when used as an offset master plate, release of the photoconductive layer from the support during offset printing, failing to obtain a large number of prints.

In order to improve electrostatic characteristics of a photoconductive layer, various proposals have hitherto been made. For example, it has been proposed to incorporate into a photoconductive layer a compound containing an aromatic ring or furan ring containing a carboxyl group or nitro group either alone or in combination with a dicarboxylic acid anhydride as disclosed in JP-B-42-6878 and JP-B-45-3073. However, the thus improved photosensitive materials are still insufficient with regard to electrostatic characteristics, particularly in light decay characteristics. The insufficient sensitivity of these photosensitive materials has been compensated by incorporating a large quantity of a sensitizing dye into the photoconductive layer. However, photosensitive materials containing a large quantity of a sensitizing dye suffer considerable deterioration of whiteness, which means reduced quality as a recording medium, sometimes causing deterioration of dark decay characteristics, resulting in the failure to obtain a satisfactory reproduced image.

On the other hand, JP-A-60-10254 (the term "JP-A" as used herein means an "unexamined published Japanese patent application") suggests to control an average molecular weight of a resin to be used as a binder of the photoconductive layer. According to this suggestion, a combined use of an acrylic resin having an acid value of from 4 to 50 whose average molecular weight is distributed within two ranges, i.e., a range of from $1\times10^3$ to $1\times10^4$ and a range of from $1\times10^4$ and $2\times10^5$, would improve electrostatic characteristics, particularly reproducibility as a PPC photoreceptor on repeated use, moisture resistance and the like.

In the field of lithographic printing plate precursors, extensive studies have been conducted to provide binder resins for a photoconductive layer having electrostatic characteristics compatible with printing characteristics. Examples of binder resins so far reported to be effective for oil-desensitization of a photoconductive layer include a resin having a molecular weight of from $1.8\times10^4$ to $10\times10^4$ and a glass transition point of from 10° to 80° C. obtained by copolymerizing a (meth)acrylate monomer and a copolymerizable monomer in the presence of fumaric acid in combination with a copolymer of a (meth)acrylate monomer and a copolymerizable monomer other than fumaric acid as disclosed in JP-B-50-31011; a terpolymer containing a (meth)acrylic ester unit having a substituent having a carboxyl group at least 7 atoms distant from the ester linkage as disclosed in JP-A-53-54027; a tetra- or pentapolymer containing an acrylic acid unit and a hydroxyethyl (meth)acrylate unit as disclosed in JP-A-54-20735 and JP-A-57-202544; a terpolymer containing a (meth)acrylic ester unit having an alkyl group having from 6 to 12 carbon atoms as a substituent and a vinyl monomer containing a carboxyl group as disclosed in JP-A-58-68046; and the like.

Nevertheless, actual evaluations of the above-described resins proposed for improving electrostatic characteristics, moisture resistance and durability revealed that none of them was satisfactory for practical use in charging properties, dark charge retention, photosensitivity, and surface smoothness of a photoconductive layer.

The binder resins proposed for use in electrophotographic lithographic printing plate precursors were also proved by evaluations to give rise to problems relating to electrostatic characteristics and background staining of prints.

SUMMARY OF THE INVENTION

One object of this invention is to provide an electrophotographic photoreceptor having improved electrostatic characteristics, particularly dark charge retention and photosensitivity, and improved image reproducibility.

Another object of this invention is to provide an electrophotographic photoreceptor which can form a reproduced image of high quality irrespective of a variation of environmental conditions at the time of reproduction of an image, such as a change to a low-temperature and low-humidity condition or to a high-temperature and high-humidity condition.

A further object of this invention is to provide a CPC electrophotographic photoreceptor having excellent electrostatic characteristics and small dependence on the environment.

A still further object of this invention is to provide a lithographic printing plate precursor which provides a lithographic printing plate causing no background stains.

A yet further object of this invention is to provide an electrophotographic photoreceptor which is hardly influenced by the kind of sensitizing dyes used.

It has now been found that the above objects of this invention can be accomplished by an electrophotographic photoreceptor comprising a support having provided thereon at least one photoconductive layer containing at least inorganic photoconductive particles and a binder resin, wherein said binder resin comprises (A) at least one resin having a weight average molecular weight of from $1\times10^3$ to $2\times10^4$ and containing at least one polar group selected from $-PO_3H_2$, $-SO_3H$, $-COOH$,

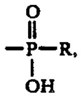

wherein R represents a hydrocarbon group or $-OR'$; and R' represents a hydrocarbon group, and a cyclic acid anhydride-containing group, and (B) at least one resin having a weight average molecular weight of $5\times10^4$ or more and containing a crosslinked structure.

DETAILED DESCRIPTION OF THE INVENTION

The resin (A) which can be used in the present invention as a binder is preferably a resin containing at least 30% by weight of a copolymerization component represented by formula (I):

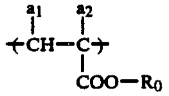

(I)

wherein $a_1$ and $a_2$, which may be the same or different, each represents a hydrogen atom, a halogen atom, a cyano group, or a hydrocarbon group; and $R_0$ represents a hydrocarbon group.

The copolymerization component represented by formula (I) is more preferably represented by formula (II) or (III):

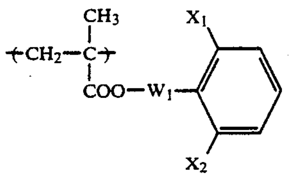

(II)

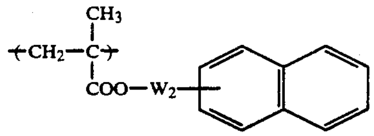

(III)

wherein $X_1$ and $X_2$ each represents a hydrogen atom, a hydrocarbon group having from 1 to 10 carbon atoms, a chlorine atom, a bromine atom, $-COY_1$ or $-COOY_2$, wherein $Y_1$ and $Y_2$ each represents a hydrocarbon group having from 1 to 10 carbon atoms, provided that both $X_1$ and $X_2$ do not simultaneously represent a hydrogen atom; and $W_1$ and $W_2$ each represents a mere bond or a linking group containing from 1 to 4 linking atoms which connects $-COO-$ and the benzene ring.

The resin (B) which can be used in the present invention is preferably a resin containing a repeating unit represented by formula (IV) shown below as a polymerization component.

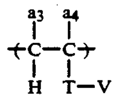

(IV)

wherein T represents $-COO-$, $-OCO-$, $-CH_2OCO-$, $-CH_2COO-$, $-O-$, or $-SO_2-$; V represents a hydrocarbon group having from 1 to 22 carbon atoms; and $a_3$ and $a_4$, which may be the same or different, each represents a hydrogen atom, a halogen atom, a cyano group, a hydrocarbon group having from 1 to 8 carbon atoms, $-COO-Z$, or $-COO-Z$ bonded via a hydrocarbon group having from 1 to 8 carbon atoms, wherein Z represents a hydrocarbon group having from 1 to 18 carbon atoms.

The resin (B) is more preferably a resin having bonded to only one of terminals of at least one polymer main chain thereof at least one polar group selected from $-PO_3H_2$, $-SO_3H$, $-COOH$,

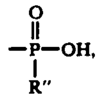

wherein R'' represents a hydrocarbon group or $-OR'''$ (wherein R''' represents a hydrocarbon group), and a cyclic acid anhydride-containing group.

The resin (B) is most preferably a resin which does not contain, as a polymerization component, a repeating unit containing the polar group present in the resin (A).

That is, the binder resin according to the present invention comprises (A) at least a low-molecular weight resin comprising a methacrylate copolymerization component having a specific substituent and a copolymerization component having a polar group (inclusive of a cyclic acid anhydride-containing group unless otherwise specified) and (B) a high-molecular weight resin at least part of which is crosslinked. The resin (B) is preferably a resin having a specific polar group at only one terminal of at least one main chain thereof [hereinafter sometimes referred to as resin (B')]. More preferably, the resin (B') contains no polar group contained in the resin (A) in the side chain thereof.

It was confirmed that the polar group contained in the resin (A) is adsorbed onto stoichiometrical defects of an inorganic photoconductive substance to sufficiently cover the surface thereof, whereby electron traps of the photoconductive substance can be compensated for and humidity resistance can be greatly improved, while assisting the photoconductive particles to be sufficiently dispersed without agglomeration. The fact that the resin (A) has a low molecular weight also functions to improve covering power for the surface of the photoconductive particles. On the other hand, the resin (B) serves to sufficiently heighten the mechanical strength of a photoconductive layer, which may be insufficient in case of using the resin (A) alone, without impairing the high electrophotographic performance properties attained by the use of the resin (A).

The photoconductive layer obtained by the present invention has improved surface smoothness. If a photoreceptor to be used as a lithographic printing plate precursor is prepared from a non-uniform dispersion of photoconductive particles in a binder resin with agglomerates being present, the photoconductive layer would have a rough surface. As a result, non-image areas cannot be rendered uniformly hydrophilic by oil-desensitization treatment with an oil-desensitizing solution. Such being the case, the resulting printing plate induces adhesion of a printing ink to the non-image areas on printing, which phenomenon leads to background stains of the non-image areas of prints.

The resin (B) is an adequately crosslinked copolymer, and the preferred resin (B') is a copolymer having a polar group bonded to one terminal of the main chain thereof. It is hence believed that in the resin (B) a mutual action is exerted between high polymer chains, while in the resin (B') a weak mutal action is exerted between the polar group and photoconductive particles. These mutual actions seem to produce synergistic effects to assure excellent electrophotographic characteristics consistently with high film strength.

If the resin (B) contains therein the same polar group as in the resin (A), the dispersed system of the photoconductive particles is destroyed to form agglomerates or precipitates. Supposing that a coating film may be formed, the resulting photoreceptor would have seriously reduced electrostatic characteristics or reduced strength against mechanical wear due to its poor surface smoothness.

Even if only the low-molecular weight resin (A) of the present invention is used as a sole binder resin, it is sufficiently adsorbed onto the photoconductive particles to cover the surface of the particles to thereby provide smoothness of the photoconductive layer, satisfactory electrostatic characteristics, and stain-free images. However, the resulting photoconductive layer does not exhibit sufficient film strength, failing to give satisfactory results in connection to durability.

In short, a proper adsorption-covering mutual action between the inorganic photoconductive particles and the binder resin and satisfactory film strength of a photoconductive layer can first be achieved only with a combined use of the resins (A) and (B).

The resin (A) has a weight average molecular weight of from $1\times10^3$ to $2\times10^4$, preferably from $3\times10^3$ to $9\times10^3$. The resin (A) preferably contains not less than 30% by weight, more preferably from 50 to 97% by weight, of the repeating unit represented by formula (II) or (III) as a copolymerization component and from 0.5 to 15% by weight, more preferably from 1 to 10% by weight, of a copolymerization component containing the specific polar group. The resin (A) preferably has a glass transition point (Tg) of from $-10°$ to $100°$ C., more preferably from $-5°$ to $80°$ C.

If the molecular weight of the resin (A) is less than $1\times10^3$, film-forming properties of the binder reduce, failing to retain sufficient film strength. On the other hand, if it exceeds $2\times10^4$, electrophotographic characteristics, and particularly initial potential and dark decay retention, are deteriorated. Such deterioration of electrophotographic characteristics is particularly conspicuous in using the high-molecular weight polymer with its polar group content exceeding 3%, resulting in considerable background staining in application as an offset master.

If the proportion of the polar group-containing copolymerization component in the resin (A) is less than 0.5% by weight, the initial potential tends to become too low to obtain a sufficient image density. If it exceeds 15% by weight, there is a tendency that dispersibility reduces, film smoothness and humidity resistance reduce, and background stains increase when the photoreceptor is used as an offset master.

As stated, the resin (A) preferably contains at least 30% by weight of a repeating unit represented by formula (I), and more preferably a repeating unit represented by formula (II) or (III), as a copolymerization component.

In formula (II), $X_1$ and $X_2$ each preferably represents a hydrogen atom, a chlorine atom, an alkyl group having up to 4 carbon atoms (e.g., methyl, ethyl, propyl, and butyl), an aralkyl group having from 7 to 9 carbon atoms (e.g., benzyl, phenethyl, 3-phenylpropyl, chlorobenzyl, dichlorobenzyl, bromobenzyl, methylbenzyl, methoxybenzyl, and chloromethylbenzyl), an aryl group (e.g., phenyl, tolyl, xylyl, bromophenyl, methoxyphenyl, chlorophenyl, and dichlorophenyl), or $-COY_1$ or $-COOY_2$, wherein $Y_1$ and $Y_2$ each preferably represents any of the above-recited hydrocarbon groups, provided that $X_1$ and $X_2$ do not simultaneously represent a hydrogen atom.

In formula (II), $W_1$ is a mere bond or a linking group containing 1 to 4 linking atoms, e.g., $-(CH_2)_n-$ (n: 1, 2 or 3), $-CH_2CH_2OCO-$, $-(CH_2)_m-$ (m: 1 or 2), and $-CH_2CH_2O-$, which connects $-COO-$ and the benzene ring.

In formula (III), $W_2$ has the same meaning as $W_1$ of formula (II).

Specific but non-limiting examples of the repeating unit represented by formula (II) or (III) are shown below.

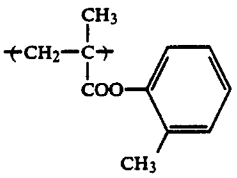
i-1)

-continued
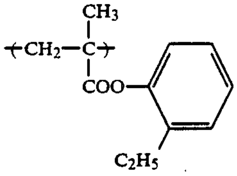
i-2)
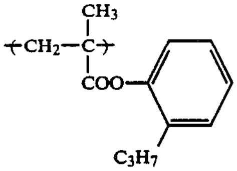
i-3)
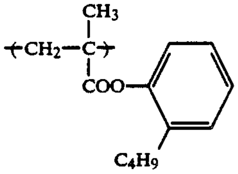
i-4)
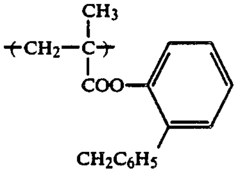
i-5)
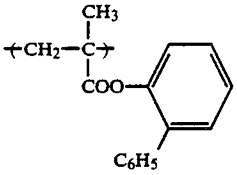
i-6)
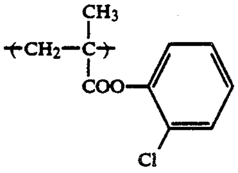
i-7)
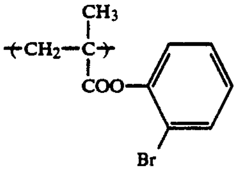
i-8)
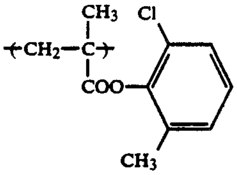
i-9)
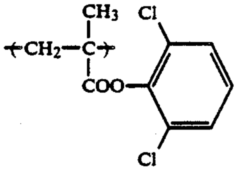
i-10)
-continued
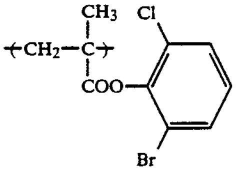
i-11)
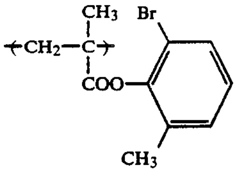
i-12)
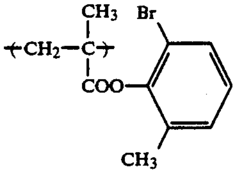
i-13)
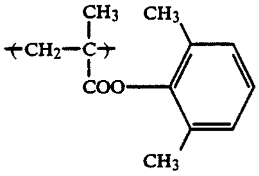
i-14)
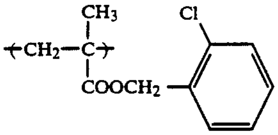
i-15)
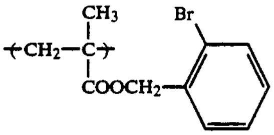
i-16)
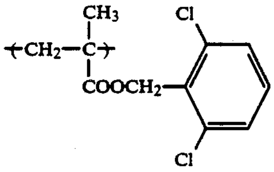
i-17)
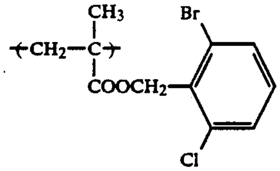
i-18)
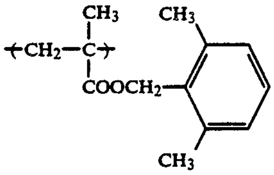
i-19)

-continued
i-20)
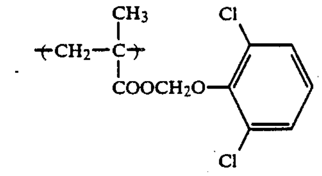
i-21)
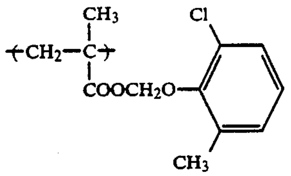
i-22)
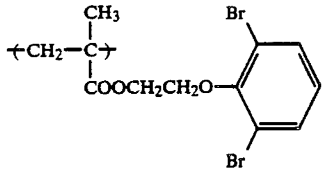
i-23)
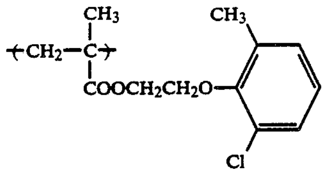
i-24)
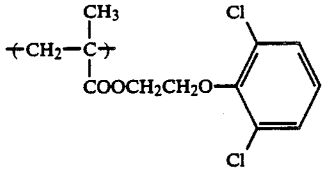
i-25)
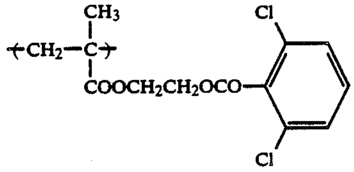
i-26)
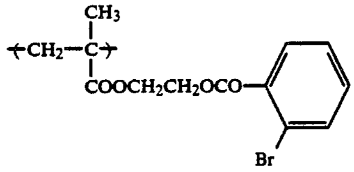
i-27)
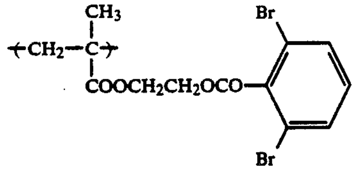
i-28)
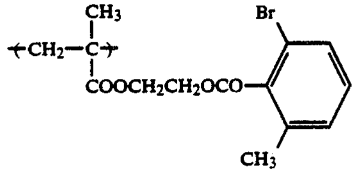
-continued
i-29)
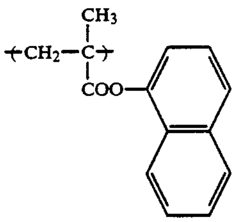
i-30)
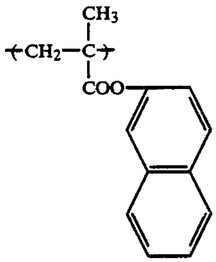
i-31)
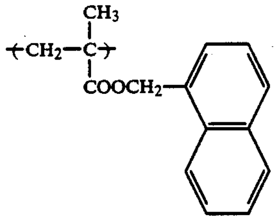
i-32)
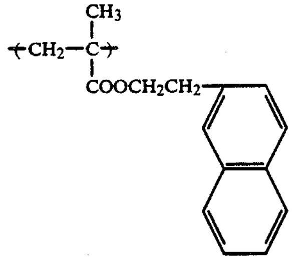
i-33)
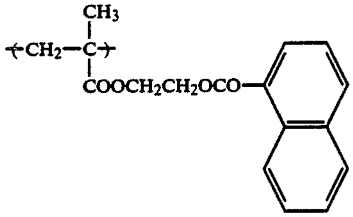
i-34)
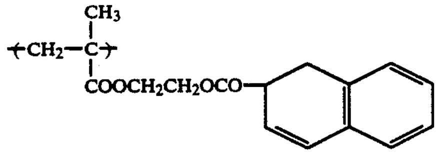
i-35)
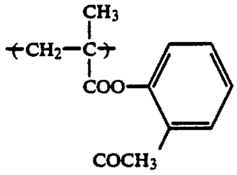

-continued

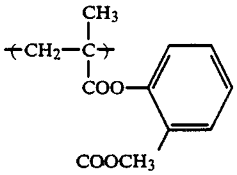
i-36)

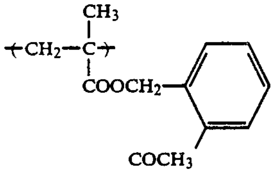
i-37)

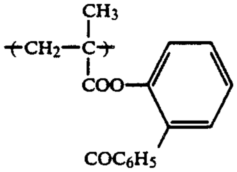
i-38)

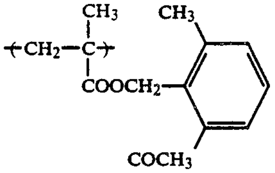
i-39)

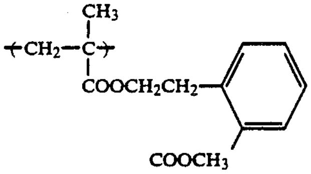
i-40)

The polar group in the resin (A) preferably includes $—PO_3H_2$, $—SO_3H$, —COOH,

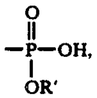

and a cyclic acid anhydride-containing group.

In the group

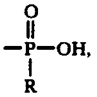

R represents a hydrocarbon group or —OR', wherein R' represents a hydrocarbon group. The hydrocarbon group as represented by R or R' preferably includes an aliphatic group having from 1 to 22 carbon atoms (e.g., methyl, ethyl, propyl, butyl, hexl, octyl, decyl, dodecyl, octadecyl, 2-chloroethyl, 2-methoxyethyl, 3-ethoxypropyl, allyl, crotonyl, butenyl, cyclohexyl, benzyl, phenethyl, 3-phenylpropyl, methylbenzyl, chlorobenzyl, fluorobenzyl, and methoxybenzyl) and a substituted or unsubstituted aryl group (e.g., phenyl, tolyl, ethylphenyl, propylphenyl, chlorophenyl, fluorophenyl, bromophenyl, chloromethylphenyl, dichlorophenyl, methoxyphenyl, cyanophenyl, acetamidophenyl, acetylphenyl, and butoxyphenyl).

The cyclic acid anhydride-containing group is a group containing at least one cyclic acid anhydride. The cyclic acid anhydride to be contained includes aliphatic dicarboxylic acid anhydrides and aromatic dicarboxylic acid anhydrides.

Specific examples of the aliphatic dicarboxylic acid anhydrides include succinic anhydride ring, glutaconic anhydride ring, maleic anhydride ring, cyclopentane-1,2-dicarboxylic acid anhydride ring, cyclohexane-1,2-dicarboxylic acid anhydride ring, and 2,3-bicyclo[2,2,-2]octanedicarboxylic acid anhydride. These rings may be substituted with, for example, a halogen atom (e.g., chlorine and bromine) and an alkyl group (e.g., methyl, ethyl, butyl, and hexyl).

Specific examples of the aromatic dicarboxylic acid anhydrides are phthalic anhydride ring, naphthalenedicarboxylic acid anhydride ring, pyridine-dicarboxylic acid anhydride ring, and thiophene-dicarboxylic acid anhydride ring. These rings may be substituted with, for example, a halogen atom (e.g., chlorine and bromine), an alkyl group (e.g., methyl, ethyl, propyl, and butyl), a hydroxyl group, a cyano group, a nitro group, and an alkoxycarbonyl group (e.g., methoxycarbonyl and ethoxycarbonyl).

The copolymerization component containing the polar group which corresponds to the repeating unit of the present invention may be any of polar group-containing vinyl compounds copolymerizable with a methacrylate monomer corresponding to the repeating unit of formula (I). Examples of such vinyl compounds are described, e.g., in Kobunshi Gakkai (ed.), *Kobunshi Data Handbook* (*Kisohen*), Baihukan (1986). Specific examples of these vinyl monomers are acrylic acid, α- and/or β-substituted acrylic acids (e.g., α-acetoxy, α-acetoxymethyl, α-(2-amino)methyl, α-chloro, α-bromo, α-fluoro, α-tributylsilyl, α-cyano, β-chloro, β-bromo, α-chloro-β-methoxy, and α,β-dichloro compounds), methacrylic acid, itaconic acid, itaconic half esters, itaconic half amides, crotonic acid, 2-alkenylcarboxylic acids (e.g., 2-pentenoic acid, 2-methyl-2-hexenoic acid, 2-octenoic acid, 4-methyl-2-hexenoic acid, and 4-ethyl-2-octenoic acid), maleic acid, maleic half esters, maleic half amides, vinylbezenecarboxylic acid, vinylbenzenesulfonic acid, vinylsulfonic acid, vinylphosphonic acid, dicarboxylic acid vinyl or allyl half esters, and ester or amide derivatives of these carboxylic acids or sulfonic acids containing the polar group in the substituent thereof.

Specific examples of the polar group-containing vinyl monomer is shown below for illustrative purposes only.

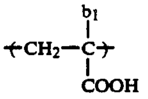
ii-1)

$b_1$ = H, $CH_3$ (hereinafter the same)

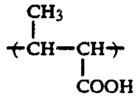
ii-2)

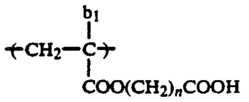
ii-3)

-continued
n = integer of 2 to 11
ii-4)
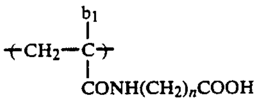
n = integer of 1 to 11
ii-5)
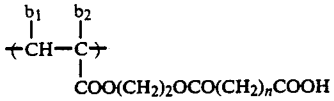
$b_2$ = H, $CH_3$, $-CH_2COOCH_3$ (hereinafter the same)
n = integer of 1 to 3
ii-6)
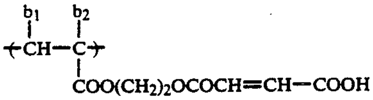
ii-7)
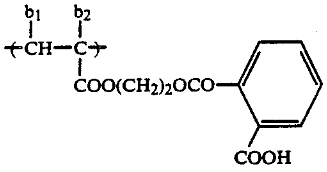
ii-8)
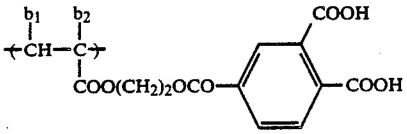
ii-9)
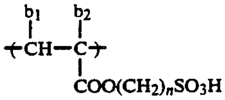
n = integer of 2 to 4
ii-10)
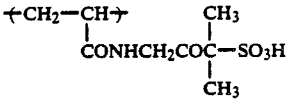
ii-11)
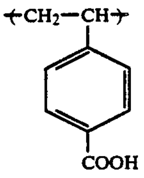
ii-12)
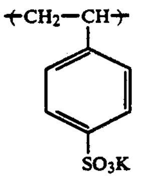
ii-13)
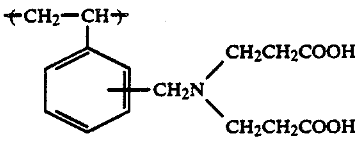
-continued
ii-14)
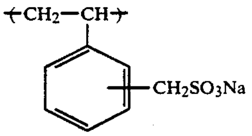
ii-15)
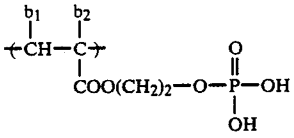
ii-16)
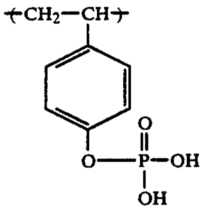
ii-17)
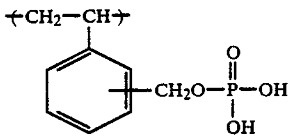
ii-18)
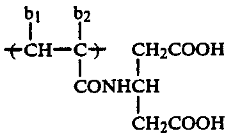
ii-19)
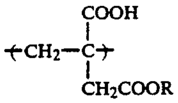
R = $C_1$–$C_4$ alkyl group
ii-20)
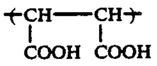
ii-21)
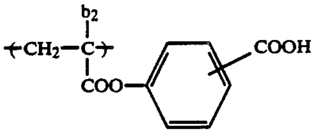
ii-22)
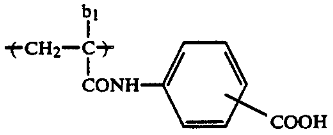
ii-23)
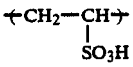
ii-24)
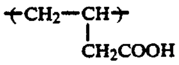
ii-25)
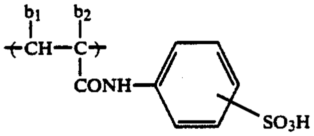

-continued ii-26)

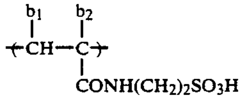

ii-27)

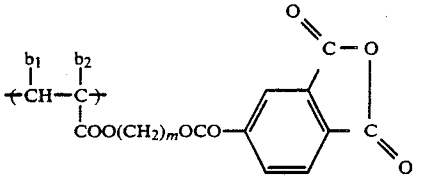

m: integer of 2 to 10 ii-28)

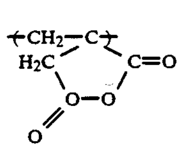

ii-29)

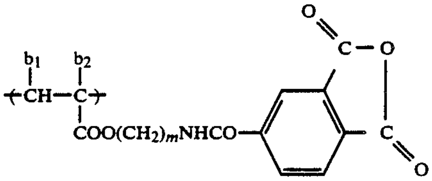

m: integer of 2 to 11 ii-30)

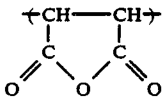

ii-31)

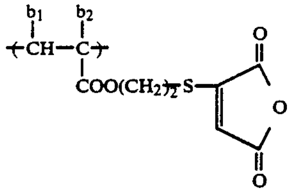

ii-32)

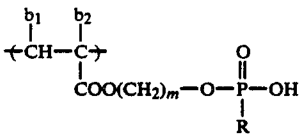

m: integer of 2 to 10
R: $C_1$-$C_6$ alkyl, benzyl or phenyl group

The resin (A) may further comprise other copolymerizable monomers in addition to the monomer of formula (II) or (III) and the polar group-containing monomer. Examples of such monomers include α-olefins, vinyl alkanoates, allyl alkanoates, acrylonitrile, methacrylonitrile, vinyl ethers, acrylic esters, methacrylic esters, acrylamides, methacrylamides, styrenes, and heterocyclic vinyl compounds (e.g., vinylpyrrolidone, vinylpyridine, vinylimidazole, vinylthiophene, vinylimidazoline, vinylpyrazole, vinyldioxane, vinylquinoline, vinylthiazole, and vinyloxazine).

The resin (B) which can be used in the present invention is a resin a part of which is crosslinked, and having a weight average molecular weight of not less than $5\times10^4$, preferably of from $5\times10^4$ to $1\times10^6$. The resin (B) preferably has a Tg ranging from 0° to 120° C., more preferably from 10° to 95° C.

If the weight average molecular weight of the resin (B) is less than $5\times10^4$, the film strength would be insufficient. If it exceeds the above-recited preferred upper limit, the resin tends to almost lose its solubility in organic solvents, becoming virtually useless.

The resin (B) is a resin a part of which is crosslinked, while satisfying the above-described physical properties. The resin (B) is preferably a homopolymer comprising a repeating unit represented by formula (IV):

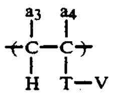

(IV)

wherein $a_3$, $a_4$, T, and V are as defined above, or a copolymer comprising the repeating unit of formula (IV) and a copolymerizable monomer unit.

In formula (IV), the hydrocarbon group may be substituted. T preferably represents —COO—, —OCO—, —$CH_2$OCO—, —$CH_2$COO—, or —O—, more preferably —COO—, —$CH_2$COO—, or —O—. V preferably represents a substituted or unsubstituted hydrocarbon group having from 1 to 18 carbon atoms. The substituent for V may be any of atoms and groups other than the above-described polar groups which may be bonded to one of the terminals of the main chain thereof and includes, for example, a halogen atom (e.g., fluorine, chlorine, and bromine), —O—$V_1$, —COO—$V_2$, and —OCO—$V_3$ (wherein $V_1$, $V_2$, and $V_3$ each represents an alkyl group having from 6 to 22 carbon atoms, e.g., hexyl, octyl, decyl, dodecyl, hexadecyl, and octadecyl groups). Preferred hydrocarbon groups include a substituted or unsubstituted alkyl group having from 1 to 18 carbon atoms (e.g., methyl, ethyl, propyl, butyl, heptyl, hexyl, octyl, decyl, dodecyl, hexadecyl, octadecyl, 2-chloroethyl, 2-bromoethyl, 2-cyanoethyl, 2-methoxycarbonylethyl, 2-methoxyethyl, and 3-bromopropyl), a substituted or unsubstituted alkenyl group having from 4 to 18 carbon atoms (e.g., 2-methyl-1-propenyl, 2-butenyl, 2-pentenyl, 3-methyl-2-pentenyl, 1-pentenyl, 1-hexenyl, 2-hexenyl, and 4-methyl-2-hexenyl), a substituted or unsubstituted aralkyl group having from 7 to 12 carbon atoms (e.g., benzyl, phenethyl, 3-phenylpropyl, naphthylmethyl, 2-naphthylethyl, chlorobenzyl, bromobenzyl, methylbenzyl, ethylbenzyl, methoxybenzyl, dimethylbenzyl, and dimethoxybenzyl), a substituted or unsubstituted alicyclic group having from 5 to 8 carbon atoms (e.g., cyclohexyl, 2-cyclohexylethyl, and 2-cyclopentylethyl), and a substituted or unsubstituted aromatic group having from 6 to 12 carbon atoms (e.g., phenyl, naphthyl, tolyl, xylyl, propylphenyl, butylphenyl, octylphenyl, dodecylphenyl, methoxyphenyl, ethoxyphenyl, butoxyphenyl, decyloxyphenyl, chlorophenyl, dichlorophenyl, bromophenyl, cyanophenyl, acetylphenyl, methoxycarbonylphenyl, ethoxycarbonylphenyl, butoxycarbonylphenyl, acetamidophenyl, propionamidophenyl, and dodecyloylamidophenyl).

$a_3$ and $a_4$, which may be the same or different, each preferably represents a hydrogen atom, a halogen atom (e.g., fluorine, chlorine, and bromine), a cyano group, an alkyl group having from 1 to 3 carbon atoms, or —COO—Z or —$CH_2$COO—Z, wherein Z preferably represents an aliphatic group having from 1 to 22 carbon atoms. More preferably, $a_3$ and $a_3$, which may be the same or different, each represents a hydrogen atom, an alkyl group having from 1 to 3 carbon atoms (e.g., methyl, ethyl, and propyl), or —COO—Z or —CH- $_2COO$—Z, wherein Z more preferably represents an alkyl or alkenyl group having up to 18 carbon atoms (e.g., methyl, ethyl, propyl, butyl, hexyl, octyl, decyl, dodecyl, tridecyl, tetradecyl, hexadecyl, octadecyl, pentenyl, hexenyl, octenyl, and decenyl). These alkyl and alkenyl groups may have the same substituents as recited with respect to V.

In the resin (B), introduction of a crosslinked structure can be carried out by utilizing generally known techniques. That is, polymerization of monomers is effected in the presence of a polyfunctional monomer; or a polymer containing a functional group capable of undergoing crosslinking reaction is subjected to high polymer reaction for crosslinking.

Crosslinking reaction induced by a self-crosslinkable functional group $—CONHCH_2OR_0$, wherein $R_0$ represents a hydrogen atom or an alkyl group, or crosslinking reaction induced by polymerization is effective, taking it into consideration that incorporation of impurities can be minimized, which problem may occur if the reaction takes a long time, the reaction is not quantitative, or a reaction promotor should be used.

In the case of using a polymerization reactive group, it is preferable that a monomer having two or more polymerizable functional groups is copolymerized with the monomer of formula (IV) to thereby form a crosslinked structure over the polymer chains.

Specific examples of the polymerizable functional group include $CH_2{=}CH—$, $CH_2{=}CH—CH_2—$,

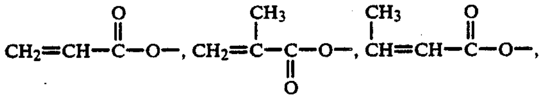

$CH_2{=}CH—CONH—$,

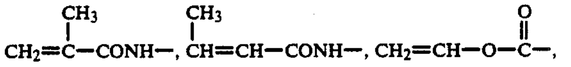

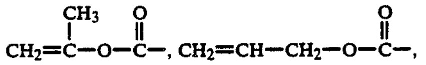

$CH_2{=}CH—NHCO—$, $CH_2{=}CH—CH_2—NHCO—$ $CH_2{=}CH—SO_2—$, $CH_2{=}CH—CO—$, $CH_2{=}CH—O—$, and $CH_2{=}CH—S—$. The two or more polymerizable functional groups in the monomer may be the same or different.

Examples of the monomer having the same polymerizable functional groups include styrene derivatives (e.g., divinylbenzene and trivinylbenzene); methacrylic, acrylic or crotonic esters, vinyl ethers or allyl ethers of polyhydric alcohols (e.g., ethylene glycol, diethylene glycol, triethylene glycol, polyethylene glycol #200, #400 or #600, 1,3-butylene glycol, neopentyl glycol, dipropylene glycol, polypropylene glycol, trimethylolpropane, trimethylolethane, and pentaerythritol) or polyhydroxyphenols (e.g., hydroquinone, resorcine, catechol and their derivatives); vinyl esters, allyl esters, vinylamides or allylamides of dibasic acids (e.g., malonic acid, succinic acid, glutaric acid, adipic acid, pimelic acid, maleic acid, phthalic acid, and itaconic acid); and condensation products of polyamines (e.g., ethylenediamine, 1,3-propylenediamine, and 1,4-butylenediamine) and vinyl-containing carboxylic acids (e.g., methacrylic acid, acrylic acid, crotonic acid, and allylacetic acid).

Examples of the monomer having different polymerizable functional groups include vinyl-containing ester derivatives or amide derivatives of vinyl-containing carboxylic acids [such as methacrylic acid, acrylic acid, methacryloylacetic acid, acryloylacetic acid, methacryloylpropionic acid, acryloylpropionic acid, itaconyloylacetic acid, itaconyloylpropionic acid, and a reaction product of a carboxylic acid anhydride and an alcohol or an amine (e.g., allyloxycarbonylpropionic acid, allyloxycarbonylacetic acid, 2-allyloxycarbonylbenzoic acid, and allylaminocarbonylpropionic acid)] (e.g., vinyl methacrylate, vinyl acrylate, vinyl itaconate, allyl methacrylate, allyl acrylate, allyl itaconate, vinyl methacryloylacetate, vinyl methacryloylpropionate, allyl methacryloylpropionate, vinyloxycarbonylmethyl methacrylate, vinyloxycarbonylmethyloxycarbonylethylene acrylate, N-allylacrylamide, N-allylmethacrylamide, N-allylitaconamide, and methacryloylpropionic acid allylamide); and condensation products of amino alcohols (e.g., aminoethanol, 1-aminopropanol, 1-aminobutanol, 1-aminohexanol, and 2-aminobutanol) and vinyl-containing carboxylic acids.

The resin (B) having a partially crosslinked structure can be obtained by polymerizing the above-described monomer having at least two polymerizable functional groups in a proportion of not more than 20% by weight of the total monomers. It is preferable to use the monomer having at least two polymerizable functional groups in a proportion of not more than 15% by weight in cases where a polar group is introduced into the terminal of the main chain by using a chain transfer agent as hereinafter described, and in a proportion of not more than 5% by weight in other cases.

When the resin (B) contains no terminal polar group [i.e., when it is not the resin (B')], a crosslinked structure may be introduced into the resin by using a resin containing a crosslinking functional group capable of undergoing curing reaction on heat and/or light application.

Such a crosslinking functional group is not limited as long as it induces chemical reaction among molecules to form a chemical bond. That is, any reaction mode in which intermolecular bonding through condensation reaction, addition reaction, etc. or crosslinking by polymerization reaction can be induced by heat and/or light can be utilized. More specifically, the resin which undergoes crosslinking reaction upon heat and/or light application includes those having at least one combination of a functional group having a dissciative hydrogen atom [e.g., —COOH, $—PO_3H_2$,

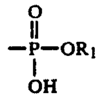

(wherein $R_1$ represents an alkyl group having from 1 to 18 carbon atoms, preferably from 1 to 6 carbon atoms (e.g., methyl, ethyl, propyl, butyl, and hexyl), an aralkyl group having from 7 to 11 carbon atoms (e.g., benzyl, phenetyl, methylbenzyl, chlorobenzyl, and methoxybenzyl), an aryl group having from 6 to 12 carbon atoms (e.g., phenyl, tolyl, xylyl, mesitylene, chlorophenyl, ethylphenyl, methoxyphenyl, and naphthyl), or $—OR_2$ (wherein $R_2$ has the same meaning as the above-described hydrocarbon groups for $R_1$)), —OH, —SH, $—NH.R_3$ (wherein $R_3$ represents a hydrogen atom or an alkyl group having from 1 to 4 carbon atoms, e.g., methyl, ethyl, propyl, and butyl)] and a functional group selected from the group consisting of

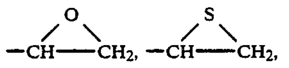

—NCO, and —NCS; and those having $—CONHCH_2OR_4$ (wherein $R_4$ represents a hydrogen atom or an alkyl group having from 1 to 6 carbon atoms, e.g., methyl, ethyl, propyl, butyl, and hexyl) or a polymerizable double bond group, etc.

Specific examples of the polymerizable double bond group are those enumerated as examples for the above-described polymerizable functional groups.

In addition, functional groups and functional group-containing compounds described in the following literatures can also be used: Tsuyoshi Endo, *Netsukokasei Kobunshi-no Seimitsuka,* C.M.C (1986), Yuji Harasaki, *Sanshin Binder Gijutsu Binran,* Ch. II-1, Sogo Gijutsu Center (1985), Takayuki Ohtsu, *Acryl Jushi-no Gosei Sekkei-to Shinyoto Kaihatsu,* Chubu Kei-ei Kaihatsu Center Shuppanbu (1985), Eizo Ohmori, *Kinosei Acryl Jushi,* Techno System (1985), Hideo Inui and Gentaro Nagamatsu, *Kankosei Kobunshi,* Kodansha (1977), Takahiro Tsunoda, *Shin Kankosei Jushi,* Insatsu Gakkai Shuppanbu (1981), G. E. Green and B. P. Star R, *J. Macro. Sci. Revs. Macro. Cem.,* C21(2), pp. 187–273 (1981–1982), and C. G. Roffey, *Photopolymerization of Surface Coatings,* A. Wiley Interscience Pub. (1982).

These crosslinking functional groups may be present in one copolymerization component or in different copolymerization components.

The monomer corresponding to the copolymerization component containing the above-described crosslinking functional group includes, for example, vinyl compounds containing the functional group which are copolymerizable with the monomer of formula (IV). Such vinyl compounds are described, e.g., in High Molecular Society (ed.), *Kobunchi Data Handbook* (*Kiso-hen*), Baihukan (1986). Specific examples of the vinyl compounds include acrylic acid, α- and/or β-substituted acrylic acids (e.g., α-acetoxyacrylic acid, α-acetoxymethylacrylic acid, α-(2-amino)methylacrylic acid, α-chloroacrylic acid, α-bromoacrylic acid, α-fluoroacrylic acid, α-tributylsilylacrylic acid, α-cyanoacrylic acid, β-chloroacrylic acid, β-bromoacrylic acid, α-chloro-β-methoxyacrylic acid, and α,β-dichloroacrylic acid), methacrylic acid, itaconic acid, itaconic acid half esters, itaconic acid half amides, crotonic acid, 2-alkenylcarboxylic acids (e.g., 2-pentenoic acid, 2-methyl-2-hexenoic acid, 2-octenoic acid, 4-methyl-2-hexenoic acid, and 4-ethyl-2-octenoic acid), maleic acid, maleic acid half esters, maleic acid half amides, vinylbenzenecarboxylic acid, vinylbenzenesulfonic acid, vinylsulfonic acid, vinylphosphonic acid, vinyl or allyl half esters of dicarboxylic acids, and ester or amide derivatives of these carboxylic acids or sulfonic acids having the aforesaid crosslinking functional group in the substituent thereof.

It is preferable that the proportion of the copolymerization component containing the crosslinking functional group in the resin (B) is from 1 to 80% by weight, more preferably from 5 to 50% by weight.

In the preparation of the resin (B) containing a crosslinking functional group, a reaction accelerator for accelerating the crosslinking reaction may be used, if desired. The reaction accelerator includes acids (e.g., acetic acid, propionic acid, butyric acid, benzenesulfonic acid, and p-toluenesulfonic acid), peroxides, azobis compounds, crosslinking agents, sensitizing agents, and photopolymerizable monomers. More specifically, crosslinking agents described, e.g., in Shinzo Yamashita and Tosuke Kaneko (ed.), *Kakyozai Handbook,* Taisei-sha (1981) can be used. For example, crosslinking agents generally employed for organosilanes, polyurethane, and polyisocyanate; and curing agents for epoxy resins and melamine resins can be used.

In the case where the resin (B) contains a photo-crosslinkable functional group, the compounds described in the references such as *Kankosei Kobunshi* cited above with respect to photosensitive resins can be used.

In addition to the monomer corresponding to the repeating unit of formula (IV) and the aforesaid polyfunctional monomer, the resin (B) may further contain other monomers [e.g., those recited as monomers which may be used in the resin (A)] as copolymerization component.

While the resin (B) is characterized by having a crosslinked structure at least in parts as stated above, it is further required to be soluble in organic solvents used for preparation of a dispersion for forming a photoconductive layer. In more detail, the resin (B) should have solubility of at least 5 parts by weight in 100 parts by weight of, e.g., a toluene solvent at 25° C. The solvent as above referred to includes halogenated hydrocarbons, e.g., dichloromethane, dichloroethane, chloroform, methylchloroform, and trichlene; alcohols, e.g., methanol, ethanol, propanol, and butanol; ketones, e.g., acetone, methyl ethyl ketone, and cyclohexanone; ethers, e.g., tetrahydrofuran and dioxane; esters, e.g., methyl acetate, ethyl acetate, propyl acetate, butyl acetate, and methyl propionate; glycol ethers, e.g., ethylene glycol monomethyl ether and 2-methoxyethyl acetate; and aromatic hydrocarbons, e.g., benzene, toluene, xylene, and chlorobenzene. These solvents may be used either individually or in combinations thereof.

Of the above-described resins (B), preferred are resins (B') in which at least one polar group selected from $—PO_3H_2$, $—SO_3H$, —COOH,

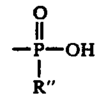

(wherein R'' represents a hydrocarbon group or —OR''', wherein R''' represents a hydrocarbon group; more specifically R'' has the same meaning as R), and a cyclic acid anhydride-containing group [having the same meaning as described with respect to the resin (A)] is bonded to only one of the terminals of at least one main chain thereof, said polymer having a weight average molecular weight of not less than $5\times10^4$, preferably from $5\times10^4$ to $1\times10^6$.

The resin (B') preferably has a Tg of from 0° to 120° C., more preferably from 10° to 95° C.

A preferred terminal polar group in the resin (B') is selected from $—PO_3H_2$, —COOH, $—SO_3H$, and

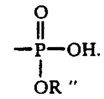

The above-specified polar group may be bonded to one of the polymer main chain terminals either directly or via an arbitrary linking group.

The linking group for connecting the polar group to the terminal is selected from a carbon-carbon bond (single bond or double bond), a carbon-hetero atom bond (the hetero atom includes an oxygen atom, a sulfur atom, a nitrogen atom, a silicon atom, etc.), a hetero atom-hetero atom bond, and an arbitrary combination thereof. Examples of the linking group are

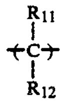

]wherein $R_{11}$ and $R_{12}$ each represents a hydrogen atom (e.g., fluorine, chlorine, and bromine), a cyano group, a hydroxyl group, or an alkyl group (e.g., methyl, ethyl, and propyl)].$\leftarrow CH{=}CH \rightarrow_z$

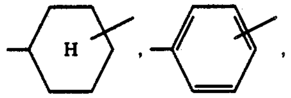

—O—, —S—,

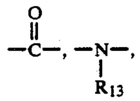

—COO—, —$SO_2$—,

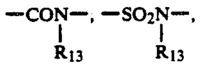

—NHCOO—, —NHCONH—, and

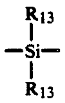

[wherein $R_{13}$ represents a hydrogen atom, a hydrocarbon group having from 1 to 8 carbon atoms (e.g., methyl, ethyl, propyl, butyl, pentyl, hexyl, benzyl, phenethyl, phenyl, and tolyl), or —$OR_{14}$ (wherein $R_{14}$ has the same meaning as the hydrocarbon groups recited for $R_{13}$).

The resin (B') according to the present invention, in which a specific polar group is bonded to only one terminal of at least one polymer main chain, thereof, can easily be prepared by an ion polymerization process in which a various kind of a reagent is reacted to the terminal of a living polymer obtained by conventionally known anion polymerization or cation polymerization; a radical polymerization process, in which radical polymerization is performed in the presence of a polymerization initiator and/or a chain transfer agent which contains a specific polar group in the molecule thereof; or a process, in which a polymer having a reactive group at the terminal as obtained by the above-described ion polymerization or radical polymerization is subjected to high polymer reaction to convert the terminal to a specific polar group.

For the details, reference can be made to it in P. Dreyfuss and R. P. Quirk, *Encycl. Polym. Sci. Eng.*, Vol. 7, p. 551 (1987), Yoshiki Nakajo and Yuya Yamashita, *Senryo to Yakuhin*, Vol. 30, p. 232 (1985), Akira Ueda and Susumu Nagai, *Kagaku to Kogyo*, Vo. 60, p. 57 (1986) and literatures cited therein.

The resin (B') can be prepared by a method, in which a mixture comprising a monomer corresponding to the repeating unit of formula (IV), the above-described polyfunctional monomer for forming a crosslinked structure, and a chain transfer agent containing a polar group to be bonded to one terminal is polymerized in the presence of a polymerization initiator (e.g., azobis compounds and peroxides), a method, in which polymerization is conducted without using the above-described chain transfer agent but a polymerization initiator containing the polar group, a method, in which polymerization is conducted using the chain transfer agent and the polymerization initiator both containing the polar group, a method according to any of the above-described three methods, in which a compound having an amino group, a halogen atom, an epoxy group, an acid halide group, etc. as the chain transfer agent or polymerization initiator, followed by high polymer reaction with such a functional group to introduce the polar group, and the like. The chain transfer agent to be used includes mercapto compounds containing a substituent capable of being converted to the polar group (e.g., thioglycolic acid, thiomaleic acid, thiosalicyclic acid, 2-mercaptopropionic acid, 3-mercaptopropionic acid, 3-mercaptobutyric acid, N-(2-mercaptopropionyl)glycine, 2-mercaptonicotinic acid, 3-[N(2-mercaptoethyl)carbamoyl]propionic acid, 3-[N-(2-mercaptoethyl)amino]propionic acid, N-(3-mercaptopropionyl)alanine, 2-mercaptoethanesulfonic acid, 3-mercaptopropanesulfonic acid, 4-mercaptobutanesulfonic acid, 2-mercaptoethanol, 3-mercapto-1,2-propanediol, 1-mercapto-2-propanol, 3-mercapto-2-butanol, mercaptophenol-2-mercaptoethylamine, 2-mercaptoimidazole, and 2-mercapto-3-pyridinol) and alkyl iodide compounds containing the polar group or the polar-group forming substitutent (e.g., iodoacetic acid, iodopropionic acid, 2-iodoethanol, 2-iodoethanesulfonic acid, and 3-iodopropanesulfonic acid). Preferred of them are mercapto compounds.

The chain transfer agent or polymerization initiator is usually used in an amount of from 0.5 to 15 parts by weight, preferably from 1 to 10 parts by weight, per 100 parts by weight of the toal monomers.

In addition to the resins (A) and (B) [inclusive of the resin (B')], the resin binder may further comprise other resins, such as alkyd resins, polybutyral resins, polyolefins, ethylene-vinyl acetate copolymers, styrene resins, ethylene-butadiene copolymers, acrylate-butadiene copolymers, and vinyl alkanoate resins.

The proportion of these other resins should not exceed 30% by weight based on the total binder. Should it be more than 30%, the effects of the present invention, particularly improvement of electrostatic characteristics, would be lost.

The ratio of the resin (A) to the resin (B) varies depending on the kind, particle size, and surface conditions of the inorganic photoconductive material used. In general, the weight ratio of the resin (A) to the resin (B) is 5 to 80:95 to 20, preferably 15 to 60:85 to 40.

The inorganic photoconductive material which can be used in the present invention includes zinc oxide, titanium oxide, zinc sulfide, cadmium sulfide, cadmium carbonate, zinc selenide, cadmium selenide, tellurium selenide, and lead sulfide.

If desired, the photoconductive layer according to the present invention may contain various spectral sensitizers. Examples of the spectral sensitizers are carbonium dyes, diphenylmethane dyes, triphenylmethane dyes, xanthene dyes, phthalein dyes, polymethine dyes (e.g., oxonol dyes, merocyanine dyes, cyanine dyes, rhodacyanine dyes, and styryl dyes), phthalocyanine dyes (inclusive of metallized dyes), and the like. Reference can be made to it in Harumi Miyamoto and Hidehiko Takei, *Imaging*, Vol. 1973, No. 8, p. 12, C. J. Young, et al., *RCA Review*, Vol. 15, p. 469 (1954), Kohei Kiyota, et al., *Denkitsushin Gakkai Ronbunshi, J 63-C*, No. 2, p. 97 (1980), Yuji Harasaki, et al., *Kogyo Kagaku Zasshi*, Vol. 66, pp. 78 and 188 (1963), and Tadaaki Tani, *Nihon Shashin Gakkaishi*, Vol. 35, p. 208 (1972).

Specific examples of the carbonium dyes, triphenylmethane dyes, xanthene dyes, and phthalein dyes are described in JP-B-51-452, JP-A-50-90334, JP-A-50-114227, JP-A-53-39130, JP-A-53-82353, U.S. Pat. Nos. 3,052,540, and 4,054,450, and JP-A-57-16456.

The polymethine dyes, such as oxonol dyes, merocyanine dyes, cyanine dyes, and rhodacyanine dyes, include those described in F. M. Harmmer, *The Cyanine Dyes and Related Compounds*. Specific examples are described in U.S. Pat. Nos. 3,047,384, 3,110,591, 3,121,008, 3,125,447, 3,128,179, 3,132,942, and 3,622,317, British Patents 1,226,892, 1,309,274 and 1,405,898, JP-B-48-7814 and JP-B-55-18892.

In addition, polymethine dyes capable of spectrally sensitizing in the longer wavelength region of 700 nm or more, i.e., from the near infrared region to the infrared region, include those described in JP-A-47-840, JP-A-47-44180, JP-B-51-41061, JP-A-49-5034, JP-A-49-45122, JP-A-57-46245, JP-A-56-35141, JP-A-57-157254, JP-A-61-26044, JP-A-61-27551, U.S. Pat. Nos. 3,619,154 and 4,175,956, and *Research Disclosure*, 216, pp. 117-118 (1982).

The photoreceptor of the present invention is particularly excellent in that the performance properties are not liable to variation even when combined with various kinds of sensitizing dyes.

If desired, the photoconductive layer may further contain various additives commonly employed in the electrophotographic photoconductive layer, such as chemical sensitizers. Examples of the additives include electron-accepting compounds (e.g., halogen, benzoquinone, chloranil, acid anhydrides, and organic carboxylic acids) described in the above-cited *Imaging*, Vol. 1973, No. 8, p. 12; and polyarylalkane compounds, hindered phenol compounds, and p-phenylenediamine compounds described in Hiroshi Komon, et al., *Saikinno Kododen Zairyo to Kankotai no Kaihatsu Jitsuyoka*, Chaps. 4 to 6, Nippon Kagaku Joho K.K. (1986).

The amount of these additives is not particularly critical and usually ranges from 0.0001 to 2.0 parts by weight per 100 parts by weight of the photoconductive substance.

The photoconductive layer of the photoreceptor suitably has a thickness of from 1 to 100 μm, particularly from 10 to 50 μm.

In cases where the photoconductive layer functions as a charge generating layer in a laminated photoreceptor composed of a charge generating layer and a charge transport layer, the thickness of the charge generating layer suitably ranges from 0.01 to 1 μm, particularly from 0.05 to 0.5 μm.

If desired, an insulating layer can be provided on the photoreceptor of the present invention. When the insulating layer is made to serve for the main purposes of protection and improvement of durability and dark decay characteristics, its thickness is relatively small. When the insulating layer is formed to provide a photoreceptor suitable for application to special electrophotographic processings, its thickness is relatively large, usually ranging from 5 to 70 μm, particularly from 10 to 50 μm.

Charge transport materials in the above-described laminated photoreceptor include polyvinylcarbazole, oxazole dyes, pyrazoline dyes, and triphenylmethane dyes. The thickness of the charge transport layer ranges from 5 to 40 μm, preferably from 10 to 30 μm.

Resins to be used in the insulating layer or charge transport layer typically include thermoplastic and thermosetting resins, e.g., polystyrene resins, polyester resins, cellulose resins, polyether resins, vinyl chloride resins, vinyl acetate resins, vinyl chloride-vinyl acetate copolymer resins, polyacrylate resins, polyolefin resins, urethane resins, epoxy resins, melamine resins, and silicone resins.

The photoconductive layer according to the present invention can be provided on any known support. In general, a support for an electrophotographic photosensitive layer is preferably electrically conductive. Any of conventionally employed conductive supports may be utilized in this invention. Examples of usable conductive supports include a base, e.g., a metal sheet, paper, a plastic sheet, etc., having been rendered electrically conductive by, for example, impregnating with a low resistant substance; the above-described base with the back side thereof (opposite to the photosensitive layer side) being rendered conductive and having further coated thereon at least one layer for the purpose of prevention of curling; the aforesaid supports having provided thereon a water-resistant adhesive layer; the aforesaid supports having provided thereon at least one precoat layer; and paper laminated with a plastic film on which aluminum, etc. is deposited.

Specific examples of conductive supports and materials for imparting conductivity are described in Yukio Sakamoto, *Denshishashin*, Vol. 14, No. 1, pp. 2-11 (1975), Hiroyuki Moriga, *Nyumon Tokushushi no Kagaku*, Kobunshi Kankokai (1975), and M. F. Hoover, *J. Macromol. Sci Chem.*, A-4(6), pp. 1327-1417 (1970).

The present invention will now be illustrated in greater detail by way of Synthesis Examples, Examples and Comparative Examples, but it should be understood that the present invention is not deemed to be limited thereto.

SYNTHESIS EXAMPLE 1.

Synthesis of Resin (A-1)

A mixed solution of 95 g of 2,6-dichlorophenyl macrylate, 5 g of acrylic acid, and 200 g of toluene was heated to 90° C. in a nitrogen stream, and 6 g of 2,2'- azobis(2,4-dimethylvaleronitrile) was added thereto to effect polymerization for 10 hours. The resulting resin [designated as (A-1)] had a weight average molecular weight (hereinafter abbreviated as Mw) of 7800.

SYNTHESIS EXAMPLES 2 TO 24

Synthesis of Resins (A-2) to (A-24)

Resins of Table 1 below were synthesized under the same polymerization conditions as in Synthesis Example 1. These resins had an Mw between 6000 and 8000.

TABLE 1

| Synthesis Example No. | Resin (A) | Composition of Resin (A) (weight ratio) |
|---|---|---|
| 2 | A-2 | 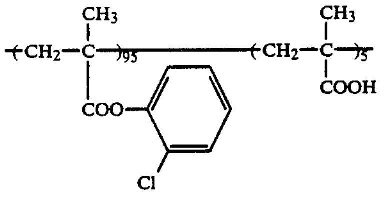 |
| 3 | A-3 | 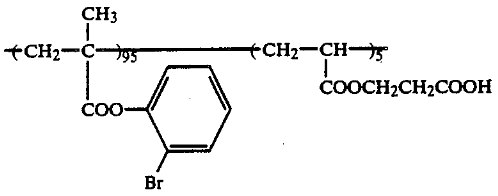 |
| 4 | A-4 | 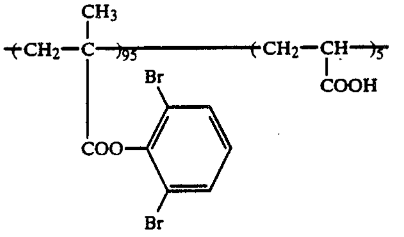 |
| 5 | A-5 | 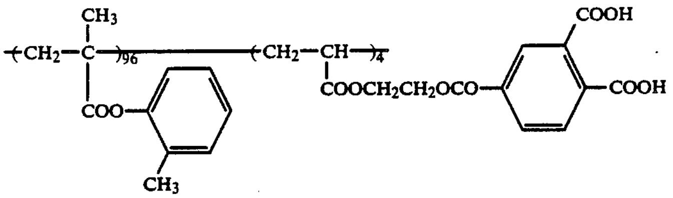 |
| 6 | A-6 | 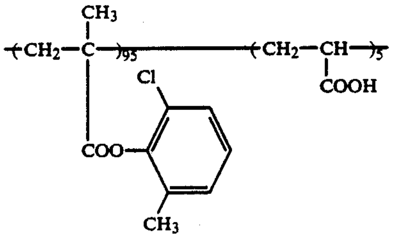 |
| 7 | A-7 | 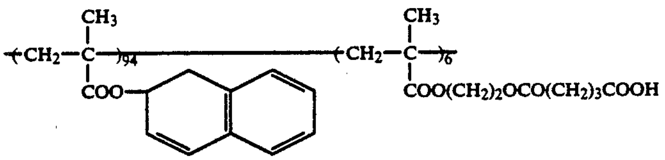 |
| 8 | A-8 | 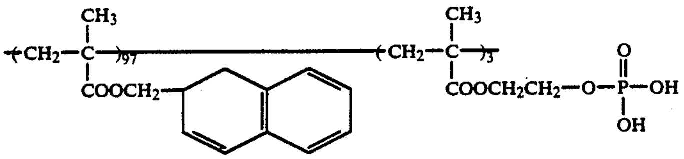 |

TABLE 1-continued
| Synthesis Example No. | Resin (A) | Composition of Resin (A) (weight ratio) |
|---|---|---|
| 9 | A-9 | 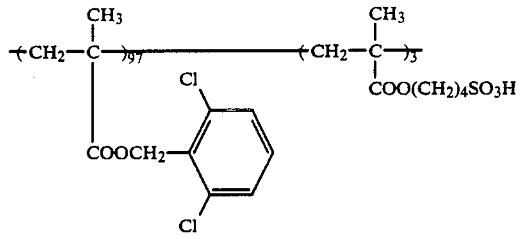 |
| 10 | A-10 | 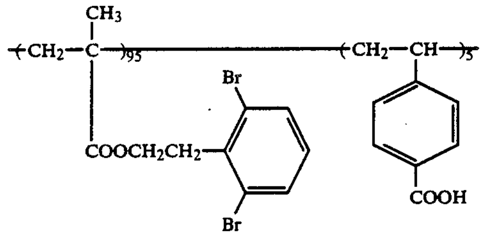 |
| 11 | A-11 | 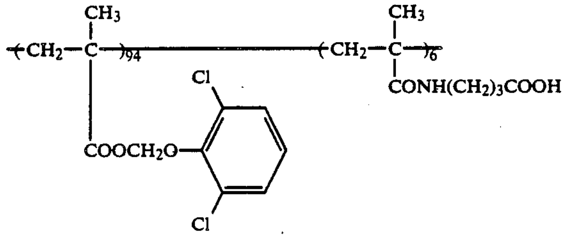 |
| 12 | A-12 | 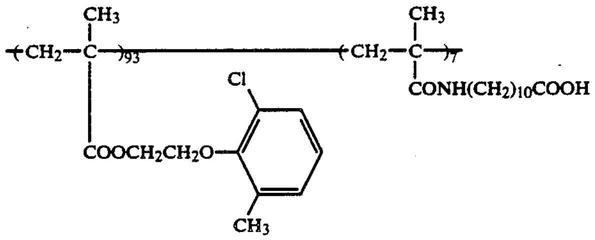 |
| 13 | A-13 | 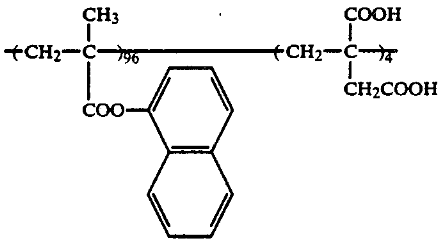 |
| 14 | A-14 | 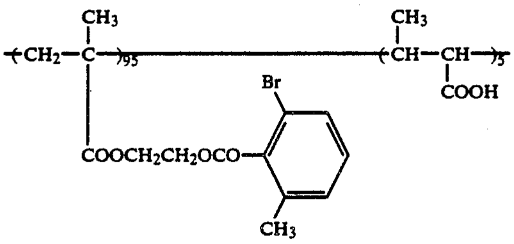 |

TABLE 1-continued
| Synthesis Example No. | Resin (A) | Composition of Resin (A) (weight ratio) |
|---|---|---|
| 15 | A-15 | 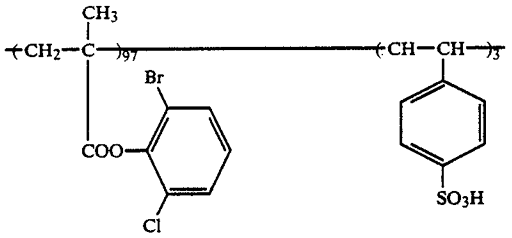 |
| 16 | A-16 | 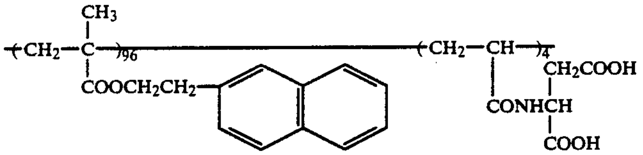 |
| 17 | A-17 | 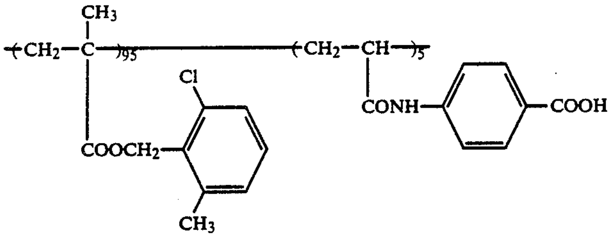 |
| 18 | A-18 | 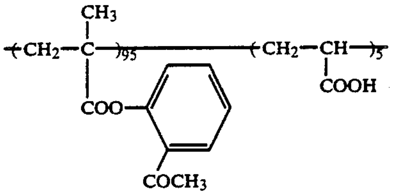 |
| 19 | A-19 | 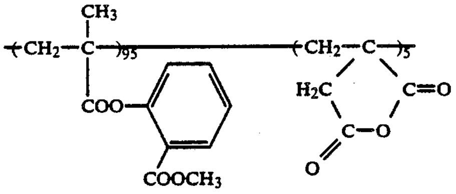 |
| 20 | A-20 | 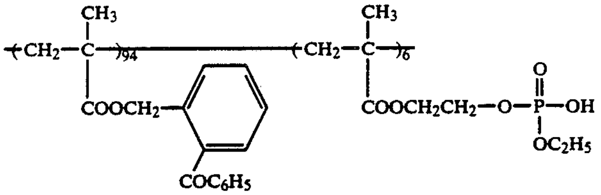 |
| 21 | A-21 | 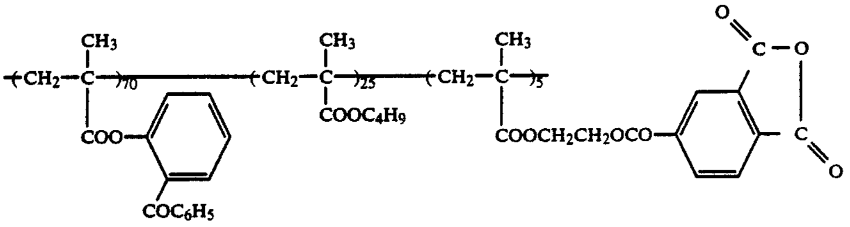 |

TABLE 1-continued

| Synthesis Example No. | Resin (A) | Composition of Resin (A) (weight ratio) |
|---|---|---|
| 22 | A-22 | 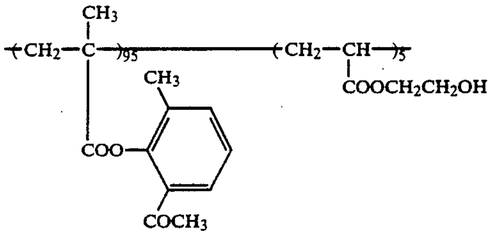 |
| 23 | A-23 | 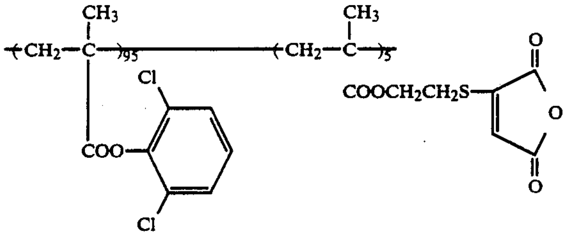 |
| 24 | A-24 | 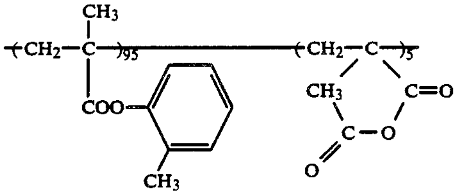 |

SYNTHESIS EXAMPLE 25

Synthesis of Resin (A-25)

A mixed solution of 95 g of 2-chloro-6-methylphenyl methacrylate, 5 g of methacrylic acid, 3 g of n-dodecylmercaptan, and 200 g of toluene was heated to 70° C. in a nitrogen stream. Then, 1.5 g of 2,2'-azobis(isobutyronitrile) was added to effect reaction for 4 hours. To the reaction mixture was further added 0.5 g of 2,2'-azobis(isobutyronitrile), followed by reacting for 4 hours. The resulting copolymer (A-25) had an Mw of 8,500.

SYNTHESIS EXAMPLES 26 TO 30

Synthesis of Resin (A-26) to (A-30)

Resins shown in Table 2 below were synthesized under the same polymerization conditions as in Synthesis Example 25. These resins had an Mw between 7000 and 9000.

TABLE 2

| Synthesis Example No. | Resin (A) | Composition of Resin (A) (weight ratio) |
|---|---|---|
| 26 | A-26 | 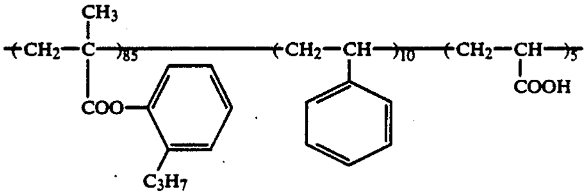 |
| 27 | A-27 | 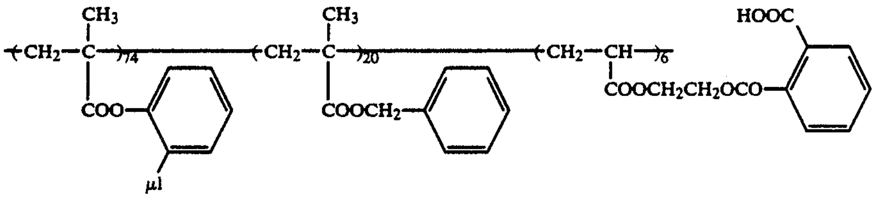 |

TABLE 2-continued

| Synthesis Example No. | Resin (A) | Composition of Resin (A) (weight ratio) |
|---|---|---|
| 28 | A-28 | 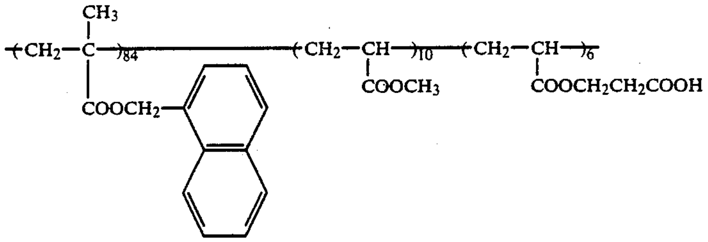 |
| 29 | A-29 | 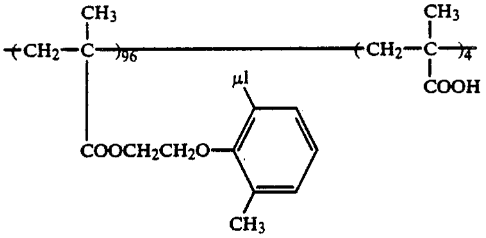 |
| 30 | A-30 | 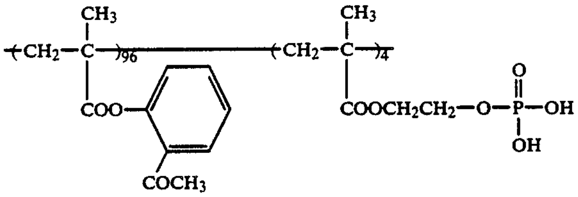 |

SYNTHESIS EXAMPLE 31

Synthesis of Resin (B-1)

A mixed solution of 100 g of ethyl methacrylate, 1.0 g of ethylene glycol, and 200 g of toluene was heated to 75° C. in a nitrogen stream, and 1.0 g of azobisisobutyronitrile was added to effect reaction for 10 hours. The resulting copolymer [designated as (B-1)] had an Mw of $4.2 \times 10^5$ and a Tg of 58° C.

SYNTHESIS EXAMPLES 32 TO 49

Synthesis of Resins (B-2) to (B-19)

Resins shown in Table 3 below were synthesized using the monomer and crosslinking monomer shown in Table 3 under the same polymerization conditions as in Synthesis example 31.

TABLE 3

| Synthesis Example No. | Resin (B) | Monomer | | Crosslinking Monomer | | Mw of Resin (B) |
|---|---|---|---|---|---|---|
| 32 | B-2 | ethyl methacrylate | 100 g | propylene glycol dimethacrylate | 1.0 g | $2.4 \times 10^5$ |
| 33 | B-3 | butyl methacrylate | 100 g | diethylene glycol dimethacrylate | 0.8 g | $3.4 \times 10^5$ |
| 34 | B-4 | propyl methacrylate | 100 g | vinyl methacrylate | 3 g | $9.5 \times 10^4$ |
| 35 | B-5 | methyl methacrylate | 80 g | divinylbenzene | 0.8 g | $8.8 \times 10^4$ |
| | | ethyl acrylate | 20 g | | | |
| 36 | B-6 | ethyl methacrylate | 75 g | diethylene glycol diacrylate | 0.8 g | $2.0 \times 10^5$ |
| | | methyl acrylate | 25 g | | | |
| 37 | B-7 | styrene | 20 g | triethylene glycol trimethacrylate | 0.5 g | $3.3 \times 10^5$ |
| | | butyl methacrylate | 80 g | | | |
| 38 | B-8 | methyl methacrylate | 40 g | IPS-22GA (produced by Okamoto Seiyu K.K.) | 0.9 g | $3.6 \times 10^5$ |
| | | propyl methacrylate | 60 g | | | |
| 39 | B-9 | benzyl methacrylate | 100 g | ethylene glycol dimethacrylate | 0.8 g | $2.4 \times 10^5$ |
| 40 | B-10 | butyl methacrylate | 95 g | ethylene glycol dimethacrylate | 0.8 g | $2.0 \times 10^5$ |
| | | 2-hydroxyethyl methacrylate | 5 g | | | |
| 41 | B-11 | ethyl methacrylate | 90 g | divinylbenzene | 0.7 g | $1.0 \times 10^5$ |
| | | acrylonitrile | 10 g | | | |
| 42 | B-12 | ethyl methacrylate | 99.5 g | triethylene glycol dimethacrylate | 0.8 g | $1.5 \times 10^5$ |
| | | methacrylic acid | 0.5 g | | | |
| 43 | B-13 | butyl methacrylate | 70 g | diethylene glycol dimethacrylate | 1.0 g | $2.0 \times 10^5$ |
| | | phenyl methacrylate | 30 g | | | |
| 44 | B-14 | ethyl methacrylate | 95 g | diethylene glycol dimethacrylate | 1.0 g | $2.4 \times 10^5$ |
| | | acrylamide | 5 g | | | |
| 45 | B-15 | propyl methacrylate | 92 g | divinylbenzene | 1.0 g | $1.8 \times 10^5$ |
| | | N,N-dimethylaminoethyl methacrylate | 8 g | | | |
| 46 | B-16 | ethyl methacrylate | 70 g | divinylbenzene | 0.8 g | $1.4 \times 10^5$ |
| | | methyl crotonate | 30 g | | | |

TABLE 3-continued

| Synthesis Example No. | Resin (B) | Monomer | | Crosslinking Monomer | | Mw of Resin (B) |
|---|---|---|---|---|---|---|
| 47 | B-17 | propyl methacrylate<br>diacetoneacrylamide | 95 g<br>5 g | propylene glycol dimethacrylate | 0.8 g | $1.8 \times 10^5$ |
| 48 | B-18 | ethyl methacrylate<br>6-hydroxyhexamethylene methacrylate | 93 g<br>7 g | ethylene glycol dimethacrylate | 0.8 g | $2.0 \times 10^5$ |
| 49 | B-19 | ethyl methacrylate<br>2-cyanoethyl methacrylate | 90 g<br>10 g | ethylene glycol dimethacrylate | 0.8 g | $1.8 \times 10^5$ |

SYNTHESIS EXAMPLE 50

Synthesis of Resin (B-20)

A mixed solution of 99 g of ethyl methacrylate, 1 g of ethylene glycol, 150 g of toluene, and 50 g of methanol was heated to 70° C. in a nitrogen stream, and 1.0 g of 4,4'-azobis(4-cyanopentanoic acid) was added to effect reaction for 8 hours. The resulting copolymer (B-19) had an Mw of $1.0\times10^5$.

SYNTHESIS EXAMPLES 51 TO 54

Synthesis of Resins (B-21) to (B-24)

Resins shown in Table 4 were synthesized under the same conditions as in Synthesis Example 50, except for replacing 4,4'-azobis(4-cyanopentanoic acid) used as a polymerization initiator in Synthesis Example 50 with each of the compounds of Table 4. The resulting resins had an Mw between $1.0\times10^5$ and $3\times10^5$.

TABLE 4

| Synthesis Example No. | Resin (B) | Polymerization Initiator (R—N═N—R) Compound | R— |
|---|---|---|---|
| 51 | B-21 | 2,2'-azobis(2-cyanopropanol) | 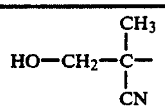 |
| 52 | B-22 | 2,2'-azobis(2-cyanopentanol) | 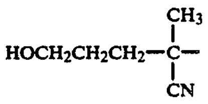 |
| 53 | B-23 | 2,2'-azobis[2-methyl-N-(2-hydroxyethyl)propionamide] | 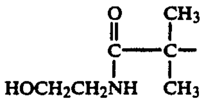 |
| 54 | B-24 | 2,2'-azobis[2-methyl-N-[1,1-bis(hydroxymethyl)-2-hydroxy-methyl)-2-hydroxyethyl]-propionamide] | 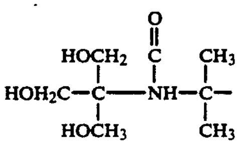 |

SYNTHESIS EXAMPLE 55

Synthesis of Resin (B-25)

A mixed solution of 99 g of ethyl methacrylate, 1.0 g of thioglycolic acid, 2.0 g of divinylbenzene, and 200 g of toluene was heated to 80° C. in a nitrogen stream while stirring. To the mixture was added 0.8 g of 2,2'-azobis(cyclohexane-1-carbonitrile) (hereinafter abbreviated as ACHN), followed by reacting for 4 hours. Then, 0.4 g of ACHN was further added thereto, followed by reacting for 2 hours. Thereafter, 0.2 g of ACHN was added, and the reaction was continued for 2 hours. The resulting copolymer had an Mw of $1.2\times10^5$.

SYNTHESIS EXAMPLES 56 TO 68

Synthesis of Resins (B-26) to (B-38)

Resins of Table 5 were synthesized in the same manner as in Synthesis Example 55, except for replacing 2.0 g of divinylbenzene as a crosslinking polyfunctional monomer with each of the polyfunctional monomers or oligomers shown in Table 5.

TABLE 5

| Synthesis Example No. | Resin (B) | Crosslinking Monomer or Oligomer Kind | Amount | Mw of Resin (B) |
|---|---|---|---|---|
| 56 | B-26 | ethylene glycol dimethacrylate | 2.5 g | $2.2 \times 10^5$ |
| 57 | B-27 | diethylene glycol dimethacrylate | 3 g | $2.0 \times 10^5$ |
| 58 | B-28 | vinyl methacrylate | 6 g | $1.8 \times 10^5$ |
| 59 | B-29 | isopropenyl methacrylate | 6 g | $2.0 \times 10^5$ |
| 60 | B-30 | divinyl adipate | 10 g | $1.0 \times 10^5$ |
| 61 | B-31 | diallyl glutaconate | 10 g | $9.5 \times 10^4$ |
| 62 | B-32 | ISP-22GA (produced by Okamura | 5 g | $1.5 \times 10^5$ |

TABLE 5-continued

| Synthesis Example No. | Resin (B) | Crosslinking Monomer or Oligomer Kind | Amount | Mw of Resin (B) |
|---|---|---|---|---|
| | | Seiyu K.K.) | | |
| 63 | B-33 | triethylene glycol diacrylate | 2 g | $2.8 \times 10^5$ |
| 64 | B-34 | trivinylbenzene | 0.8 g | $3.0 \times 10^5$ |
| 65 | B-35 | polyethylene glycol #400 diacrylate | 3 g | $2.5 \times 10^5$ |
| 66 | B-36 | polyethylene glycol dimethacrylate | 3 g | $2.5 \times 10^5$ |
| 67 | B-37 | trimethylolpropane triacrylate | 0.5 g | $1.8 \times 10^5$ |
| 68 | B-38 | polyethylene glycol #600 diacrylate | 3 g | $2.8 \times 10^5$ |

SYNTHESIS EXAMPLES 69 TO 79

Synthesis of Resins (B-39) to (B-49)

A mixed solution of 39 g of methyl methacrylate, 60 g of ethyl methacrylate, 1.0 g of each of the mercapto compounds shown in Table 6 below, 2 g of ethylene glycol dimethacrylate, 150 g of toluene, and 50 g of methanol was heated to 70° C. in a nitrogen stream, and 0.8 g of 2,2'-azobis(isobutyronitrile) was added thereto to effect reaction for 4 hours. Then, 0.4 g of 2,2'-azobis-(isobutyronitrile) was further added thereto, followed by reacting for an additional period of. 4 hours. The resulting copolymers had an Mw between $9.5\times10^4$ to $2\times10^5$.

TABLE 6

| Synthesis Example No. | Resin (B) | Mercapto Compound |
|---|---|---|
| 69 | B-39 | 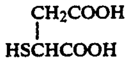 |
| 70 | B-40 | 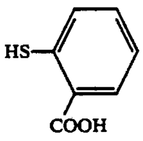 |
| 71 | B-41 | $HSCH_2CH_2NH_2$ |
| 72 | B-42 | 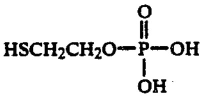 |
| 73 | B-43 | 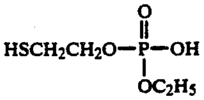 |
| 74 | B-44 | 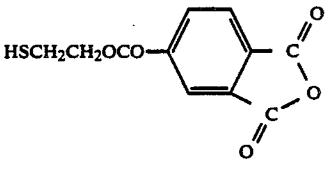 |

TABLE 6-continued

| Synthesis Example No. | Resin (B) | Mercapto Compound |
|---|---|---|
| 75 | B-45 | $HSCH_2CH_2COOH$ |
| 76 | B-46 | 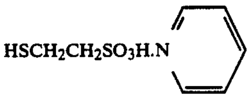 |
| 77 | B-47 | $HSCH_2CH_2NHCO(CH_2)_3COOH$ |
| 78 | B-48 | 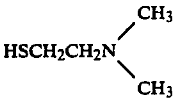 |
| 79 | B-49 | $HSCH_2CH_2OH$ |

EXAMPLE 1

A mixture consisting of 6 g (solid basis) of (A-1) prepared in Synthesis Example 1, 34 g (solid basis) of (B-1) prepared in Synthesis Example 31, 200 g of zinc oxide, 0.02 g of a heptamethinecyanine dye (A) shown below, 0.05 g of phthalic anhydride, and 300 g of toluene was dispersed in a ball mill for 2 hours. The resulting photosensitive composition was coated on paper having been rendered conductive with a wire bar to a dry thickness of 18 $g/m^2$, followed by drying at 110° C. for 1 minute. The coating was allowed to stand in a dark place at 20° C. and 65 %RH (relative humidity) for 24 hours to prepare an electrophotographic photoreceptor.

DYE (A)

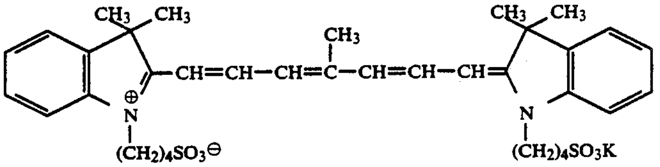

EXAMPLE 2

An electrophotographic photoreceptor was prepared in the same manner as in Example 1, except for replacing 34 g of (B-1) with 34 g (solid basis) of (B-25).

COMPARATIVE EXAMPLE A

An electrophotographic photoreceptor was prepared in the same manner as in Example 1, except for replacing 6 g of (A-1) and 34 g of (B-1) with 40 g (solid basis) of (A-1).

COMPARATIVE EXAMPLE B

An electrophotographic photoreceptor was prepared in the same manner as in Comparative Example A, except for replacing 40 g of (A-1) with 40 g (solid basis) of an ethyl mlethacrylate/acrylic acid (95/5 by weight) copolymer (Mw: 7500) [designated as (R-1)].

COMPARATIVE EXAMPLE C

An electrophotographic photoreceptor was prepared in the same manner as in Comparative Example A, except for replacing 40 g of (A-1) with 40 g of an ethyl methacrylate/acrylic acid (98.5/1.5 by weight) copolymer (Mw: 45000) [designated as (R-2)].

COMPARATIVE EXAMPLE D

An electrophotographic photoreceptor was prepared in the same manner as in Example 1, except for replacing 6 g of (A-1) with 6 g of (R-1).

COMPARATIVE EXAMPLE E

An electrophotographic photoreceptor was prepared in the same manner as in Example 2, except for replacing 6 g of (A-1) with 6 g of (R-1).

Each of the photoreceptors obtained in Examples 1 to 2 and Comparative Examples A to E was evaluated for film properties in terms of surface smoothness and mechanical strength; electrostatic characteristics; image forming performance; and stability of image forming performance against variation of environmental conditions in accordance with the following test methods. Further, an offset master plate was produced from each of the photoreceptors, and the oil-desensitivity of the photoconductive layer in terms of contact angle with water after oil-desensitization and printing durability were evaluated in accordance with the following test methods. The results obtained are shown in Table 7 below.

1) Smoothness of Photoconductive Layer

The smoothness (sec/cc) was measured by means of a Beck's smoothness tester manufactured by Kumagaya Riko K.K. under an air volume condition of 1 cc.

2) Mechanical Strength of Photoconductive Layer

The surface of the photoreceptor was repeatedly rubbed with emery paper (#1000) under a load of 50 $g/cm^2$ by the use of a Heidon 14 Model surface testing machine (manufactured by Shinto Kagaku K.K.). After dusting, the abrasion loss of the photoconductive layer was measured to obtain a film retention (%).

3) Electrostatic Characteristics

The sample was charged by corona discharge to a voltage of 6 kV for 20 seconds in a dark room at 20° C. and 65% RH using a paper analyzer ("Paper Analyzer SP-428" manufactured by Kawaguchi Denki K.K.). After the elapse of 10 seconds from the end of the corona discharge, the surface potential $V_{10}$ was measured. The standing of the sample in dark was further continued for an additional 90 seconds, and the potential $V_{100}$ was measured. The dark decay retention (DRR; %), i.e., percent retention of potential after dark decay for 90 seconds, was calculated from equation:

$$DRR\ (\%)=(V_{100}/V_{10})\times 100$$

Separately, the sample was charged to −400 V by corona discharge and then exposed to light emitted from a gallium-aluminum-arsenic semi-conductor laser (oscillation wavelength: 830 nm), and the time required for decay of the surface potential $V_{10}$ to one-tenth was measured to obtain an exposure $E_{1/10}$ (erg/cm$^2$).

The measurement was conducted under conditions of 20° C. and 65% RH (hereinafter referred to as Condition I) or 30° C. and 80% RH (hereinafter referred to as Condition II).

4) Image Forming Performance

After the samples were allowed to stand for one day at 20° C. and 65% RH (Condition I) or at 30° C. and 80% RH (Condition II), each sample was charged to −6 kV and exposed to light emitted from a gallium-aluminum-arsenic semi-conductor laser (oscillation wavelength: 830 nm; output: 2.8 mW) at an exposure amount of 64 erg/cm2 (on the surface of the photoconductive layer) at a pitch of 25 μm and a scanning speed of 300 m/sec. The electrostatic latent image was developed with a liquid developer ("ELP-T" produced by Fuji Photo Film Co., Ltd.), followed by fixing. The reproduced image was visually evaluated for fog and image quality.

5) Contact Angle With Water

The sample was passed once through an etching processor using an oil-desensitizing solution ("ELP-E" produced by Fuji Photo Film Co., Ltd.) to render the surface of the photoconductive layer oil-desensitive. On the thus oil-desensitized surface was placed a drop of 2 μl of distilled water, and the contact angle formed between the surface and water was measured by a goniometer.

6) Printing Durability

The sample was processed in the same manner as described in 4) above, and the surface of the photoconductive layer was subjected to oil-desensitization under the same conditions as in 5) above. The resulting lithographic printing plate was mounted on an offset printing machine ("Oliver Model 52", manufactured by Sakurai Seisakusho K.K.), and printing was carried out on fine paper. The number of prints obtained until background stains on non-image areas appeared or the quality of image areas was deteriorated was taken as printing durability. The larger the number of the prints, the higher the printing durability.

TABLE 7

| | Example 1 | Example 2 | Comparative Example A | Comparative Example B | Comparative Example C | Comparative Example D | Comparative Example E |
|---|---|---|---|---|---|---|---|
| Surface Smoothness (sec/cc) | 90 | 90 | 90 | 90 | 35 | 88 | 92 |
| Film Strength (%) | 85 | 93 | 70 | 65 | 65 | 85 | 90 |
| $V_{10}$ (-V): | | | | | | | |
| Condition I | 600 | 630 | 630 | 520 | 410 | 525 | 530 |
| Condition II | 580 | 630 | 625 | 480 | 300 | 500 | 505 |
| DRR (%): | | | | | | | |
| Condition I | 85 | 88 | 88 | 85 | 65 | 65 | 66 |
| Condition II | 80 | 88 | 84 | 70 | 35 | 30 | 30 |
| $E_{1/10}$ (erg/cm$^2$): | | | | | | | |
| Condition I | 40 | 35 | 35 | 46 | 120 | 45 | 45 |

TABLE 7-continued

| | Example 1 | Example 2 | Comparative Example A | Comparative Example B | Comparative Example C | Comparative Example D | Comparative Example E |
|---|---|---|---|---|---|---|---|
| Condition II | 42 | 35 | 35 | 50 | 75 | 48 | 46 |
| Image Forming Performance: | | | | | | | |
| Condition I | good | good | good | good | poor (cut of fine letters or lines) | good | good |
| Condition II | good | good | good | no good (reduction of $D_m$) | very poor (fog, marked streaks) | no good (reduction of $D_m$) | no good (reduction of $D_m$) |
| Contact Angle with Water (°) | 12 | 11 | 10 | 11 | 25-30 (wide scatter) | 12 | 12 |
| Printing Durability | 8000 | 10000 or more | 3000 | 3000 | background stains from the start of printing | 8000 | 10000 or more |

As can be seen from Table 7, each of the photoreceptors according to the present invention exhibited satisfactory surface smoothness, film strength, and electrostatic characteristics. When it was used as an offset master plate precursor, the reproduced image was clear and free from background stains on the non-image area. The superiority of the photoreceptors of the invention seems to be attributed to sufficient adsorption of the binder resin onto the photoconductive substance and sufficient covering over the surface of the photoconductive particles with the binder resin. For the same reason, oil-desensitization of the offset master plate precursor with an oil-desensitizing solution sufficiently proceeded to render non-image areas sufficiently hydrophilic, as proved by such a small contact angle of 20° or less with water. On practical printing using the resulting master plate, no background stains were observed in the prints.

The sample of Comparative Example A using only the resin (A) exhibited very excellent electrostatic characteristics. However, when an offset master printing plate produced therefrom was used for printing, deterioration of image quality of prints occurred from the 3000th print.

The sample of Comparative Example B had a reduced DRR after 90 seconds and an increased $E_{1/10}$.

The sample of Comparative Example C, in which the resin had the similar chemical structure as that of the resin of Comparative Example B but a higher weight average molecular weight, exhibited seriously inferior electrostatic characteristics. From this fact, it is believed that a binder resin having an increased molecular weight not only absorbs onto the photoconductive particles but induces agglomeration of the particles, giving adverse influences to dispersion.

From all these considerations, an electrophotographic photoreceptor satisfying both electrostatic characteristics and printing suitability can first be obtained by using the resin binder according to the present invention.

EXAMPLES 3 TO 26

An electrophotographic photoreceptor was prepared in the same manner as in Example 1, except for replacing (A-1) and (B-1) with each of the resins (A) and (B) shown in Table 8, respectively. Various performance properties of the resulting photoreceptors were evaluated in the same manner as in Example 1, and the results obtained are shown in Table 8.

TABLE 8

| Example No. | Resin (A) | Resin (B) | $V_{10}$ (-V) | DRR (%) | $E_{1/10}$ (erg/cm²) | Printing Durability |
|---|---|---|---|---|---|---|
| 3 | (A-2) | (B-2) | 550 | 83 | 41 | 8000 |
| 4 | (A-3) | (B-2) | 555 | 83 | 40 | 8000 |
| 5 | (A-4) | (B-4) | 580 | 85 | 39 | 8000 |
| 6 | (A-6) | (B-4) | 580 | 86 | 39 | 8000 |
| 7 | (A-7) | (B-5) | 580 | 87 | 38 | 8500 |
| 8 | (A-8) | (B-6) | 560 | 86 | 40 | 8000 |
| 9 | (A-9) | (B-7) | 555 | 84 | 40 | 8500 |
| 10 | (A-10) | (B-7) | 550 | 82 | 41 | 8500 |
| 11 | (A-11) | (B-8) | 550 | 81 | 41 | 8000 |
| 12 | (A-13) | (B-10) | 570 | 83 | 39 | 8000 |
| 13 | (A-15) | (B-11) | 595 | 83 | 40 | 8500 |
| 14 | (A-17) | (B-14) | 560 | 83 | 40 | 8000 |
| 15 | (A-20) | (B-16) | 555 | 81 | 42 | 8000 |
| 16 | (A-1) | (B-10) | 600 | 85 | 38 | 8000 |
| 17 | (A-1) | (B-20) | 605 | 86 | 35 | 8300 |
| 18 | (A-3) | (B-21) | 560 | 85 | 35 | 10000 or more |
| 19 | (A-4) | (B-22) | 585 | 85 | 36 | 10000 or more |
| 20 | (A-6) | (B-23) | 580 | 88 | 36 | 10000 or more |
| 21 | (A-7) | (B-32) | 585 | 88 | 34 | 10000 or more |
| 22 | (A-9) | (B-35) | 560 | 87 | 35 | 10000 or more |
| 23 | (A-15) | (B-39) | 600 | 88 | 35 | 10000 or more |

TABLE 8-continued

| Example No. | Resin (A) | Resin (B) | $V_{10}$ (-V) | DRR (%) | $E_{1/10}$ (erg/cm$^2$) | Printing Durability |
|---|---|---|---|---|---|---|
| 24 | (A-17) | (B-40) | 570 | 85 | 37 | 10000 or more |
| 25 | (A-23) | (B-41) | 585 | 88 | 35 | 10000 or more |
| 26 | (A-16) | (B-44) | 550 | 83 | 39 | 10000 or more |

EXAMPLES 27 TO 45

A mixture consisting of 6.5 g of each of resins (A) shown in Table 9, 33.5 g of each of resins (B) shown in Table 9, 200 g of zinc oxide, 0.05 g of Rose Bengale, 0.03 g of Tetrabromophenol Blue, 0.02 g of uranine, 0.01 g of phthalic anhydride, and 240 g of toluene was dispersed in a ball mill for 2 hours. The resulting photoconductive composition was coated on paper having been rendered conductive with a wire bar to a dry thickness of 18 g/m$^2$ and heated at 110° C. for 30 seconds. Then, the resulting coated material was allowed to stand at 20° C. and 65% RH for 24 hours to obtain an electrophotographic photoreceptor. Each of the resulting photoreceptors was evaluated in the same manner as in Example 1 with the following exceptions. In the evaluation of electrostatic characteristics, $E_{1/10}$ (lus.sec) was obtained by charging the photoconductive layer to −400 V by corona discharge, exposing the photoconductive layer to visible light of 2.0 lux, and measuring the time required for decreasing the surface potential ($V_{10}$) to one-tenth. In the production of a printing plate, a toner image was formed by using an automatic plate making machine "ELP 404V" manufactured by Fuji Photo Film Co., Ltd. and a toner "ELP-T". The results obtained are shown in Table 9.

TABLE 9

| Example No. | Resin (A) | Resin (B) | $V_{10}$ (-V) | DRR (%) | $E_{1/10}$ (lux · sec) | Printing Durability |
|---|---|---|---|---|---|---|
| 27 | (A-1) | (B-2) | 630 | 90 | 6.0 | 8000 |
| 28 | (A-2) | (B-4) | 560 | 85 | 7.5 | 8000 |
| 29 | (A-7) | (B-5) | 585 | 86 | 6.0 | 8000 |
| 30 | (A-11) | (B-6) | 550 | 85 | 8.5 | 8000 |
| 31 | (A-12) | (B-7) | 545 | 83 | 8.5 | 8500 |
| 32 | (A-14) | (B-7) | 550 | 82 | 8.3 | 8500 |
| 33 | (A-16) | (B-11) | 555 | 83 | 7,8 | 8500 |
| 34 | (A-26) | (B-13) | 550 | 82 | 8.5 | 8000 |
| 35 | (A-27) | (B-15) | 560 | 84 | 8.1 | 8000 |
| 36 | (A-29) | (B-18) | 550 | 81 | 8.5 | 8000 |
| 37 | (A-1) | (B-19) | 625 | 89 | 6.0 | 10000 or more |
| 38 | (A-6) | (B-24) | 580 | 90 | 6.0 | 10000 or more |
| 39 | (A-13) | (B-49) | 585 | 88 | 6.3 | 10000 or more |
| 40 | (A-18) | (B-2) | 570 | 86 | 6.3 | 8000 |
| 41 | (A-19) | (B-4) | 580 | 88 | 6.2 | 8000 |
| 42 | (A-20) | (B-21) | 550 | 81 | 8.6 | 8000 |
| 43 | (A-21) | (B-22) | 555 | 83 | 8.5 | 10000 or more |
| 44 | (A-23) | (B-23) | 590 | 89 | 6.5 | 10000 or more |
| 45 | (A-24) | (B-49) | 575 | 85 | 7.0 | 10000 or more |

As can be seen from Table 9, each of the electrophotographic photoreceptors according to the present invention was proved excellent in charging properties, dark charge retention, and photosensitivity and provided a clear reproduced image free from background fog even when processed under severe conditions of high temperature and high humidity (30° C., 80% RH).

When an offset printing plate produced from each of the photoreceptors of the invention was used as an offset master for printing, prints of clear image could be obtained as demonstrated by the printing durability of Table 9.

SYNTHESIS EXAMPLE 80

A mixed solution of 95 g of ethyl methacrylate, 5 g of acrylic acid, and 200 g of toluene was heated to 90° C. in a nitrogen stream, and 6 g of 2,2'-azobis(2,4-dimethylvaleronitrile) was added thereto to effect reaction for 10 hours. The resulting copolymer (A-31) had an Mw of 7800 and a Tg of 45° C.

SYNTHESIS EXAMPLE 81

A mixed solution of 100 g of ethyl methacrylate, 1.0 g of ethylene glycol, and 200 g of toluene was heated to 75° C. in a nitrogen stream, and 1.0 g of azobisisobutyronitrile was added thereto to effect reaction for 10 hours. The resulting copolymer (B-50) had an Mw of $4.2\times10^5$ and a Tg of 58° C.

SYNTHESIS EXAMPLE 82

A mixed solution of 94 g of ethyl methacrylate, 6 g of acrylic acid, and 200 g of toluene was heated to 70° C. in a nitrogen stream, and 0.5 g of azobisisobutyronitrile was added thereto to effect reaction for 10 hours. The resulting copolymer (B-50) had an Mw of $6\times10^4$.

SYNTHESIS EXAMPLE 83

A mixed solution of 98 g of ethyl methacrylate, 2 g of acrylic acid, and 200 g of toluene was heated to 70° C. in a nitrogen stream, and 0.5 g of azobisisobutyronitrile was added thereto to effect reaction for 10 hours. The resulting copolymer (B-52) had an Mw of $6.1\times10^4$.

EXAMPLE 46

A mixture consisting of 10 g (solid basis) of (A-31) prepared in Synthesis Example 80, 30 g (solid basis) of (B-50) prepared in Synthesis Example 81, 200 g of zinc oxide, 0.05 g of Rose Bengale, 0.05 g of maleic anhydride, and 300 g of toluene was dispersed in a ball mill for 2 hours. The resulting photosensitive composition was coated on paper having been rendered conductive with a wire bar to a dry thickness of 25 g/m², followed by drying at 110° C. for 1 minute. The coating was allowed to stand in a dark place at 20° C. and 65% RH for 24 hours to prepare an electrophotographic photoreceptor.

COMPARATIVE EXAMPLE F

An electrophotographic photoreceptor was prepared in the same manner as in Example 46, except for replacing (A-31) and (B-50) with 40 g (solid basis) of (A-31).

COMPARATIVE EXAMPLE G

An electrophotographic photoreceptor was prepared in the same manner as in Example 46, except for replacing (A-31) and (B-50) with 40 g (solid basis) of (B-51).

COMPARATIVE EXAMPLE H

An electrophotographic photoreceptor was prepared in the same manner as in Example 46, except for replacing (A-31) and (B-50) with 40 g (solid basis) of (B-52).

Each of the photoreceptors obtained in Example 46 and Comparative Examples F to H was evaluated in the same manner as in Example 1, and the results obtained are shown in Table 10. In Table 10, the electrostatic characteristics ($V_{10}$, DRR, $E_{1/10}$) were determined only under the condition I (20° C., 65% RH).

TABLE 10

| | Example 46 | Comparative Example F | Comparative Example H |
|---|---|---|---|
| Surface Smoothness (sec/cc) | 94 | 80 | 20 |
| Film Strength (%) | 98 | 60 | 90 |
| $V_{10}$ (-V) | 580 | 605 | 540 |
| DRR (%) | 95 | 96 | 85 |
| $E_{1/10}$ (lux.sec) | 8.0 | 8.5 | 7.0 |
| Image Forming Performance: | | | |
| Condition I | good | good | good |
| Condition II | good | good | $D_m$ was unmeasurable. cut of thin lines was observed. |
| Contact Angle with Water (°) | 13 | 12 | 33 |
| Background Stain Resistance:* | | | |
| Condition I | excellent | excellent | very poor |
| Condition II | good | good | extremely poor |
| Printing Durability | 10000 or more | 3000 | background stains was observed from the start of printing |

*Background Stain Resistance:
(1) Condition I
Each of the samples was processed using a full-automatic plate making machine ("ELP 404 V" manufactured by Fuji Photo Film Co., Ltd.) to form a toner image. The toner image was subjected to oil-desensitization under the same conditions as in 5) Contact Angle with Water described hereinabove. The oil-desensitized toner image was used as an offset master on an offset printing machine ("Hamadastar 800 SX" manufactured by Hamadastar Co., Ltd.) to print 500 sheets of papers. Background stains on the printed paper was visually evaluated. The results are designated as Background Stain Resistance: Condition I.
(2) Condition II
The same procedure as in Condition I was repeated but using oil-desensitizing solution diluted five times and dampening water diluted twice at the time of printing. Printing under Condition II means that printing is carried out under more severe conditions than under Condition I.

As is shown in Table 10, the samples of Example 46 and Comparative Example F exhibited satisfactory surface smoothness and electrostatic characteristics and provided a clear reproduced image free from background stains. The satisfactory image forming performance of these photoreceptors is considered attributed to sufficient adsorption of the binder resin onto the photoconductive particles and sufficient covering over the surface of the photoconductive particles with the binder resin.

For the same reason, when these photoreceptors were used as an offset master plate precursor, oil-desensitization with an oil-desensitizing solution sufficiently proceeded to render non-image areas sufficiently hydrophilic, as proved by such a small contact angle of 15° or less with water. On practical printing, no background stains were observed in the prints. However, the sample of Comparative Example F was found poor in film strength, resulting in poor printing durability.

On the other hand, in Comparative Example G, the binder resin caused considerable agglomeration, failing to obtain a film-forming dispersion. In Comparative Example H, in which a high-molecular weight resin having a reduced proportion of an acid component was used, the photoreceptor suffered serious deterioration in surface smoothness, and both electrostatic characteristics and printing performance were so poor that it was almost of no practical use. This seems to be because the binder resin adsorbed on the photoconductive particles but caused agglomeration of the photoconductive particles.

It was thus proved that the electrophotographic photoreceptors of the present invention are satisfactory in all the requirements of surface smoothness, film strength, electrostatic characteristics, and printing performance.

SYNTHESIS EXAMPLES 84 TO 98

Resins (A) shown in Table 11 were synthesized in the same manner as for (A-31) of Synthesis Example 80.

TABLE 11

| Synthesis Example | Resin (A) | Monomer Composition (Weight Ratio) | | | | Mw of Resin (A) ($\times10^3$) |
|---|---|---|---|---|---|---|
| 84 | A-32 | ethyl methacrylate | 94 | itaconic acid | 6 | 7.9 |

TABLE 11-continued

| Synthesis Example | Resin (A) | Monomer Composition (Weight Ratio) | | | | Mw of Resin (A) ($\times 10^3$) |
|---|---|---|---|---|---|---|
| 85 | A-33 | ethyl meth-acrylate | 95 | 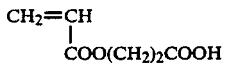 | 5 | 7.7 |
| 86 | A-34 | ethyl meth-acrylate | 92 | 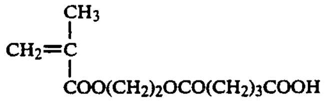 | 8 | 7.6 |
| 87 | A-35 | ethyl meth-acrylate | 92 | 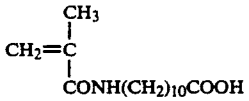 | 8 | 7.8 |
| 88 | A-36 | ethyl meth-acrylate | 95 | 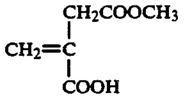 | 5 | 8.0 |
| 89 | A-37 | ethyl meth-acrylate | 95 | 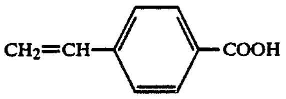 | 5 | 8.2 |
| 90 | A-38 | ethyl meth-acrylate | 95 | 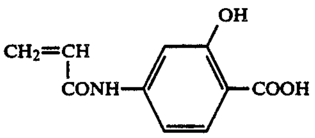 | 5 | 8.0 |
| 91 | A-39 | ethyl meth-acrylate | 98 | 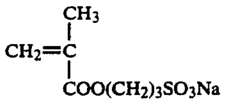 | 2 | 7.6 |
| 92 | A-40 | ethyl meth-acrylate | 99 | 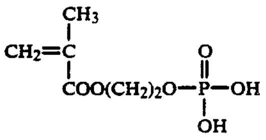 | 1 | 7.8 |
| 93 | A-41 | ethyl meth-acrylate | 98 | 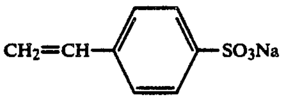 | 2 | 8.0 |
| 94 | A-42 | ethyl meth-acrylate | 95 | 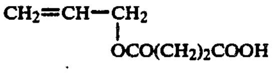 | 5 | 8.3 |
| 95 | A-43 | ethyl meth-acrylate | 99 | 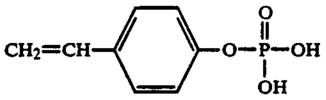 | 1 | 7.7 |
| 96 | A-44 | ethyl meth-acrylate | 98 | 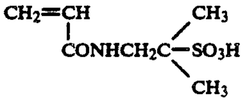 | 2 | 7.6 |
| 97 | A-45 | ethyl meth-acrylate | 95 | 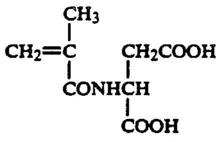 | 5 | 7.5 |

TABLE 11-continued

| Synthesis Example | Resin (A) | Monomer Composition (Weight Ratio) | | | | Mw of Resin (A) (×10³) |
|---|---|---|---|---|---|---|
| 98 | A-46 | ethyl methacrylate | 95 | 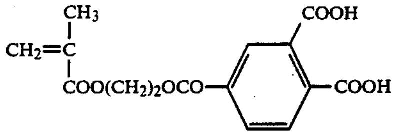 | 5 | 7.9 |

EXAMPLE 47

An electrophotographic photoreceptor was prepared in the same manner as in Example 46, except for using 10 g (solid basis) of each of the resulting resins (A) and 30 g of (B-50) synthesized in Synthesis Example 81.

Each of the resulting photoreceptors was evaluated in the same manner as in Example 46 and, as a result, revealed substantially equal to the sample of Example 46 in terms of surface smoothness and film strength.

Further, every photoreceptor according to the present invention was excellent in charging properties, dark decay retention, and photosensitivity and provided a clear reproduced image free from background fog even when processed under severe conditions of high temperature and high humidity (30° C., 80% RH).

EXAMPLE 48

A mixed solution of 48.5 g of ethyl methacrylate, 48.5 g of benzyl methacrylate, 3 g of methacrylic acid, and 200 g of toluene was heated to 105° C. in a nitrogen stream, and 10 g of azobisisobutyronitrile was added thereto to effect reaction for 8 hours.

The resulting copolymer had an Mw of 6500 and a Tg of 40° C.

A mixture consisting of 20 g (solid basis) of the resulting copolymer, 20 g of (B-50), 200 g of zinc oxide, 0.02 g of the same heptamethinecyanine dye as used in Example 1, 0.15 g of phthalic anhydride, and 300 g of toluene was dispersed in a ball mill for 2 hours to prepare a photoconductive layer-forming composition. An electrophotographic photoreceptor was prepared in the same manner as in Example 46, except for using the resulting composition.

COMPARATIVE EXAMPLE I

A mixed solution of 48.5 g of ethyl methacrylate, 48.5 g of benzyl methacrylate, 3 g of methacrylic acid, and 200 g of toluene was heated to 70° C. in a nitrogen stream, and 10 g of azobisisobutyronitrile was added thereto to effect reaction for 8 hours.

The resulting copolymer had an Mw of 36000 and a Tg of 54° C.

A comparative electrophotographic photoreceptor was prepared in the same manner as in Example 48, except for using 40 g (solid basis) of the resulting copolymer as a binder resin.

Each of the photoreceptors obtained in Example 48 and Comparative Example I was evaluated for surface smoothness, film strength, and electrostatic characteristics in the same manner as in Example 46. In the determination of electrostatic characteristics, a gallium-aluminum-arsenic semi-conductor laser (oscillation wavelength: 780 nm) was used as a light source. The results obtained are shown in Table 12.

TABLE 12

| | Example 48 | Compar. Example I |
|---|---|---|
| Surface Smoothness (sec/cc) | 105 | 94 |
| Film Strength (%) | 98 | 89 |
| Electrostatic Characteristics: | | |
| $V_{10}$ (-V) | 600 | 500 |
| DRR (%) | 88 | 45 |
| $E_{1/10}$ (erg/cm²) | 51 | 43 |

The sample of Comparative Example I exhibited poor surface smoothness and suffered considerable reduction of dark decay retention (DRR). The seemingly low $E_{1/10}$ and high photosensitivity of this sample are ascribed to the high DRR. The DRR is worse as compared with the sample of Comparative Example H, which implies that the conventionally known resin is considerably susceptible to the influence of the spectral sensitizing dye used in combination. To the contrary, the binder resin of the present invention provides a photoreceptor excellent in charging properties, dark decay retention and photosensitivity irrespective of the change of chemical structure of the spectral sensitizing dye used.

EXAMPLES 49 TO 55

An electrophotographic photoreceptor was prepared in the same manner as in Example 46, except for using, as a binder, (A-31) and each of the resins (B) shown in Table 13 at a weight ratio of 1:1.

TABLE 13

| Example No. | Resin (B) | Monomer | | Crosslinking Monomer | | Mw of Resin (B) |
|---|---|---|---|---|---|---|
| 49 | (B-53) | ethyl methacrylate | 100 g | ethylene glycol dimethacrylate | 1.0 g | $2.4 \times 10^5$ |
| 50 | (B-54) | butyl methacrylate | 100 g | diethylene glycol dimethacrylate | 0.8 g | $3.4 \times 10^5$ |
| 51 | (B-55) | propyl methacrylate | 100 g | vinyl methacrylate | 3 g | $9.5 \times 10^4$ |
| 52 | (B-56) | methyl methacrylate<br>ethyl acrylate | 80 g<br>20 g | divinylbenzene | 2 g | $8.8 \times 10^4$ |
| 53 | (B-57) | ethyl methacrylate<br>methyl acrylate | 75 g<br>25 g | diethylene glycol | 0.8 g | $2.0 \times 10^5$ |
| 54 | (B-58) | styrene<br>butyl methacrylate | 20 g<br>80 g | triethylene glycol trimethacrylate | 0.5 g | $3.3 \times 10^5$ |
| 55 | (B-59) | methyl methacrylate<br>propyl methacrylate | 40 g<br>60 g | IPS-22GA (produced by Okamoto | 0.9 | $3.6 \times 10^5$ |

TABLE 13-continued

| Example No. | Resin (B) | Monomer | Crosslinking Monomer | Mw of Resin (B) |
|---|---|---|---|---|
| | | | Seiyu K.K.) | |

Each of the photoreceptors was evaluated for surface smoothness, film strength, and electrostatic characteristics in the same manner as in Example 46 and, as a result, proved satisfactory in film strength and electrostatic characteristics. It provided a clear reproduced image free from background fog even when processed under a high temperature and high humidity condition (30° C., 80% RH).

Thus, the electrophotographic photoreceptor according to the present invention exhibits superiority in any of surface smoothness, film strength, electrostatic characteristics, and image forming performance and provides a lithographic printing plate excellent in background stain resistance and printing durability. The photoreceptor of the invention retains its superiority in surface smoothness and electrostatic characteristics even when combined with various kinds of sensitizing dyes.

SYNTHESIS EXAMPLE 99

Synthesis of Resin (A-47)

A mixed solution of 95 g of ethyl methacrylate, 5 g of acrylic acid, and 200 g of toluene was heated to 90° C. in a nitrogen stream, and 6 g of 2,2'-azobis(2,4 dimethylvaleronitrile) was added thereto to effect reaction for 10 hours. The resulting resin (A-47) had an Mw of 7800 and a Tg of 45° C.

SYNTHESIS EXAMPLE 100

Synthesis of Comparative Resin (R-3)

A mixed solution of 94 g of ethyl methacrylate, 6 g of acrylic acid, and 200 g of toluene was heated to 70° C. in a nitrogen stream, and 0.5 g of azobisisobutyronitrile was added thereto to effect reaction for 10 hours. The resulting copolymer (R-3) had an Mw of 60000.

SYNTHESIS EXAMPLE 101

Synthesis of Comparative Resin (R-4)

A mixed solution of 97 g of ethyl methacrylate, 3 g of acrylic acid, and 200 g of toluene was heated to 70° C. in a nitrogen stream, and 0.5 g of azobisisobutyronitrile was added thereto to effect reaction for 10 hours. The resulting copolymer (R-4) had an Mw of 65000.

SYNTHESIS EXAMPLE 102

Synthesis of Resin (B-60)

A mixed solution of 100 g of ethyl methacrylate, 1.5 g of thioglycolic acid, 2.5 g of divinylbenzene, and 200 g of toluene was heated to 80° C. in a nitrogen stream while stirring, and 0.8 g of ACHN was added thereto to effect reaction for 4 hours. Then, 0.4 g of ACHN was added, followed by reacting for 2 hours, and 0.2 g of ACHN was further added, followed by reacting for 2 hours. After cooling, the reaction mixture was poured into 1.5 l of methanol, and the precipitated white powder was collected by filtration and dried to obtain 88 g of a powder. The resulting copolymer (B-60) had an Mw of $1.5\times10^5$.

SYNTHESIS EXAMPLES 103 TO 115

Synthesis of Resins (B-61) to (B-73)

Resins (B) shown in Table 14 were synthesized in the same manner as in Synthesis Example 102, except for replacing 100 g of ethyl methacrylate with, each of the monomers of Table 14.

TABLE 14

| Synthesis Example No. | Resin (B) | Monomer | | Mw |
|---|---|---|---|---|
| 103 | (B-61) | n-propyl methacrylate | 100 g | $1.6 \times 10^5$ |
| 104 | (B-62) | n-butyl methacrylate | 100 g | $1.8 \times 10^5$ |
| 105 | (B-63) | benzyl methacrylate | 100 g | $1.8 \times 10^5$ |
| 106 | (B-64) | methyl methacrylate<br>ethyl methacrylate | 40 g<br>60 g | $1.5 \times 10^5$ |
| 107 | (B-65) | methyl methacrylate<br>methyl acrylate | 80 g<br>20 g | $1.0 \times 10^5$ |
| 108 | (B-66) | ethyl methacrylate<br>acrylonitrile | 80 g<br>20 g | $1.2 \times 10^5$ |
| 109 | (B-67) | ethyl methacrylate<br>2-hydroxyethyl methacrylate | 90 g<br>10 g | $1.1 \times 10^5$ |
| 110 | (B-68) | butyl methacrylate<br>methoxymethyl methacrylate | 85 g<br>15 g | $1.4 \times 10^5$ |
| 111 | (B-69) | ethyl methacrylate<br>phenyl methacrylate | 70 g<br>30 g | 1.5 c $10^5$ |
| 112 | (B-70) | methyl methacrylate<br>decyl methacrylate | 95 g<br>5 g | $1.0 \times 10^5$ |
| 113 | (B-71) | isopropyl methacrylate | 100 g | $1.6 \times 10^5$ |
| 114 | (B-72) | isobutyl methacrylate | 100 g | $1.8 \times 10^5$ |
| 115 | (B-73) | t-butyl methacrylate<br>phenethyl methacrylate | 70 g<br>30 g | $1.6 \times 10^5$ |

SYNTHESIS EXAMPLES 116 TO 128

Resins (B) shown in Table 15 were synthesized in the same manner as in Synthesis Example 102, except for replacing 2.5 g of divinylbenzene as a crosslinking polyfunctional monomer with each of the polyfunctional monomers or oligomers of Table 15.

TABLE 15

| Synthesis Example No. | Resin (B) | Crosslinking Monomer or Oligomer | | Mw |
|---|---|---|---|---|
| 116 | (B-74) | ethylene glycol dimethacrylate | 1.5 g | $2.2 \times 10^5$ |
| 117 | (B-75) | diethylene glycol dimethacrylate | 2.0 g | $2.0 \times 10^5$ |
| 118 | (B-76) | vinyl methacrylate | 4 g | $1.8 \times 10^5$ |
| 119 | (B-77) | isopropenyl methacrylate | 4 g | $2.0 \times 10^5$ |
| 120 | (B-78) | divinyl adipate | 8 g | $1.0 \times 10^5$ |
| 121 | (B-79) | diallyl glutaconate | 8 g | $9.5 \times 10^5$ |
| 122 | (B-80) | ISP-22GA (produced by Okamura Seiyu K.K.) | 3 g | $1.5 \times 10^5$ |
| 123 | (B-81) | triethylene glycol diacrylate | 2 g | $2.8 \times 10^5$ |
| 124 | (B-82) | trivinylbenzene | 0.5 g | $3.0 \times 10^5$ |
| 125 | (B-83) | polyethylene glycol #400 diacrylate | 3 g | $2.5 \times 10^5$ |
| 126 | (B-84) | polyethylene glycol dimethacrylate | 3 g | $2.5 \times 10^5$ |
| 127 | (B-85) | trimethylolpropane triacrylate | 0.3 g | $1.8 \times 10^5$ |
| 128 | (B-86) | polyethylene glycol | 3 g | $2.8 \times 10^5$ |

TABLE 15-continued

| Synthesis Example No. | Resin (B) | Crosslinking Monomer or Oligomer | Mw |
|---|---|---|---|
| | | #600 diacrylate | |

SYNTHESIS EXAMPLE 129

Synthesis of Resin (B-87)

A mixed solution of 88.5 g of benzyl methacrylate, 1.5 g of thiomalic acid, 2.5 g of divinylbenzene, 150 g of toluene, and 50 g of ethanol was heated to 70° C. in a nitrogen stream, and 1.0 g of 2,2'-azobis(isobutyronitrile) (hereinafter abbreviated as AIBN) was added thereto to effect reaction for 5 hours. To the reaction mixture was further added 0.2 g of AIBN, followed by reacting for 3 hours, and 0.2 g of AIBN was furthermore added thereto to conduct reaction for 3 hours. After cooling, the reaction mixture was poured into 2 l of methanol, and the precipitated white powder was collected by filtration and dried to obtain 80 g of a copolymer (B-87) having an Mw of $1.3\times10^5$.

SYNTHESIS EXAMPLES 130 TO 135

Synthesis of Resins (B-88) to (B-93)

Resins of Table 16 were synthesized in the same manner as in Synthesis Example 129, except for replacing 1.5 g of thiomalic acid with 1.5 g of each of the mercapto compounds of Table 16.

TABLE 16

| Synthesis Example No. | Resin (B) | Mercapto Compound | Mw |
|---|---|---|---|
| 130 | (B-88) | $HSCH_2CH_2COOH$ | $1.0\times10^5$ |
| 131 | (B-89) | $HSCH_2CH_2SO_3H.N$ 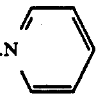 | $1.2\times10^5$ |
| 132 | (B-90) | 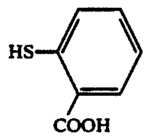 | $1.3\times10^5$ |
| 133 | (B-91) | 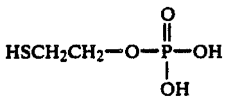 | $9.8\times10^4$ |

TABLE 16-continued

| Synthesis Example No. | Resin (B) | Mercapto Compound | Mw |
|---|---|---|---|
| 134 | (B-92) | $HSCH_2CH_2NHCO(CH_2)_2COOH$ | $1.1\times10^5$ |
| 135 | (B-93) | $HSCH_2CH_2NHCH_2CH_2COOH$ | $9.5\times10^4$ |

SYNTHESIS EXAMPLE 136

Synthesis of Resin (94)

A mixed solution of 100 g of ethyl methacrylate, 0.5 g of ethylene glycol dimethacrylate, 150 g of toluene, and 30 g of isopropyl alcohol was heated to 80° C. in a nitrogen stream, and 1.5 g of 2,2'-azobis(4-cyanovaleric acid) (abbreviated as ACV) was added thereto to effect reaction for 5 hours. Then, 0.5 g of ACV was again added thereto, followed by further reacting for 3 hours. The resulting copolymer (B-94) had an Mw of $2.2\times10^5$.

SYNTHESIS EXAMPLES 137 TO 142

Synthesis of Resins (B-95) to (B-100)

Resins of Table 17 below were synthesized in the same manner as in Synthesis Example 136, except for replacing 100 g of ethyl methacrylate and 0.5 g of ethylene glycol dimethacrylate with each of the monomers and each of crosslinking monomers of Table 17, respectively.

TABLE 17

| Synthesis Example No. | Resin (B) | Monomer | | Crosslinking Monomer | | Mw |
|---|---|---|---|---|---|---|
| 137 | (B-95) | butyl methacrylate | 100 g | divinylbenzene | 0.6 g | $3.6\times10^5$ |
| 138 | (B-96) | benzyl methacrylate | 100 g | " | 0.5 g | $2.0\times10^5$ |
| 139 | (B-97) | propyl methacrylate | 100 g | diethylene glycol dimethacrylate | 0.6 g | $1.8\times10^5$ |
| 140 | (B-98) | butyl methacrylate | 60 g | diethylene glycol dimethacrylate | 0.6 g | $2.0\times10^5$ |
| | | methyl methacrylate | 40 g | | | |
| 141 | (B-99) | methyl methacrylate | 85 g | divinylbenzene | 0.5 g | $2.2\times10^5$ |
| | | methyl acrylate | 15 g | | | |
| 142 | (B-100) | methyl methacrylate | 90 g | ISP-22GA (produced by Okamura Seiyu K.K.) | 0.8 g | $1.5\times10^5$ |
| | | ethyl acrylate | 10 g | | | |

EXAMPLE 56

A mixture consisting of 8 g (solid basis) of (A-47) synthesized in Synthesis Example 99, 32 g (solid basis) of (B-60) synthesized in Synthesis Example 102, 200 g of zinc oxide, 0.05 g of Rose Bengale, 0.05 g of phthalic anhydride, and 300 g of toluene was dispersed in a ball mill for 2 hours. The resulting composition for forming a photoconductive layer was coated on paper having been rendered conductive with a wire bar to a dry thickness of 18 g/m² and dried at 110° C. for 1 minute. The coated material was allowed to stand in a dark place at 20° C. and 65% RH for 24 hours to obtain an electrophotographic photoreceptor.

COMPARATIVE EXAMPLE J

An electrophotographic photoreceptor was prepared in the same manner as in Example 56, except for replacing (A-47) and (B-60) as used in Example 56 with 40 g (solid basis) of (A-47).

COMPARATIVE EXAMPLE K

An electrophotographic photoreceptor was prepared in the same manner as in Example 56, except for replacing (A 47) and (B-60) with 40 g (solid basis) of (B-60) as a binder.

COMPARATIVE EXAMPLE L

An electrophotographic photoreceptor was prepared in the same manner as in Example 56, except for replacing (A-47) and (B-60) with 40 g of a resin (R-5) having the following structure:

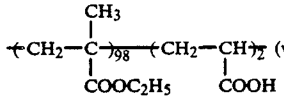

(weight ratio)

COMPARATIVE EXAMPLE M

An electrophotographic photoreceptor was prepared in the same manner as in Example 56, except for replacing 32 g of (B-60) as used in Example 56 with 32 g of (R-5) as used in Comparative Example L.

Each of the photoreceptors obtained in Example 56 and Comparative Examples J to M was evaluated in the same manner as in Example 46, and the results obtained are shown in Table 18 below.

hydrophilic as proved by the small contact angle with water of 15° or less. No background stains of prints was observed at all upon actual printing. However, the sample of Comparative Example J was found to have insufficient film strength, giving rise to a problem relating printing durability on printing.

On the other hand, the photoreceptor of Comparative Example K provided a reproduced image of deteriorated quality when processed under the condition II (30° C., 80% RH).

For comparison, the inventors tried to prepare a dispersion of zinc oxide by using (R- ) synthesized in Synthesis Example but failed, only to obtain an agglomerate. Hence, the high-molecular weight resin (R-5) having a reduced acid component content was used instead as in Comparative Example L, but the resulting photoreceptor suffered serious deterioration of surface smoothness, and both electrostatic characteristics and printing properties were so deteriorated that the photoreceptor was of no practical use. This seems to be because the binder resin adsorbed onto the photoconductive substance but caused agglomeration among the photoconductive particles.

Comparative Example M, in which (R-5) was used in

TABLE 18

| | Example 56 | Comparative Example J | Comparative Example K | Comparative Example L | Comparative Example M |
|---|---|---|---|---|---|
| Surface Smoothness (sec/cc) | 105 | 100 | 95 | 30 | 35 |
| Film Strength (%) | 97 | 60 | 98 | 70 | 65 |
| $V_{10}$ (−V) | 545 | 550 | 535 | 430 | 450 |
| DRR (%) | 94 | 93 | 88 | 65 | 70 |
| $E_{1/10}$ (lux · sec) | 7.9 | 8.0 | 7.5 | 6.0 | 6.5 |
| Image Forming Performance: | | | | | |
| Condition I | good | good | good | no good ($D_m$ was hardly measurable) | no good ($D_m$ was hardly measurable) |
| Condition II | good | good | no good ($D_m$ was hardly measurable) | poor ($D_m$ was unmeasurable, cut of thin lines) | poor ($D_m$ was unmeasurable, cut of thin lines) |
| Contact Angle with Water (°) | 11 | 10 | 15 | 25-30 (widely scattered) | 20-25 (widely scattered) |
| Background Stain Resistance: | | | | | |
| Condition I | good | good | good | very poor (remarkable background stains) | very poor (remarkable background stains) |
| Condition II | good | good | no good (slight stains) | extremely | very poor |
| Printing Durability | 10000 or more | 3000 | 10000 or more | background stains from the start | background stains from the start |

As is shown in Table 18, the samples of Example 56 and Comparative Example J exhibited satisfactory surface smoothness and electrostatic characteristics and provided a clear reproduced image free from fog. These properties are considered attributable to sufficient adsorption of the binder onto the photoconductive substance and sufficient covering of the binder over the photoconductive particles.

For the same reason, when these samples were used as an offset master printing plate precursor, oil-desensitization with an oil-desensitizing solution sufficiently proceeded to render the non-image area sufficiently combination with the low-molecular weight resin of the present invention, gave the similar results as in Comparative Example L.

From all these considerations, only the photoreceptors according to the present invention were proved satisfactory in all of surface smoothness, film strength, electrostatic characteristics, and printing properties.

SYNTHESIS EXAMPLES 143 TO 157

Resins (A) shown in Table 19 were synthesized in the same manner as for (A-47) of Synthesis Example 99.

TABLE 19

| Synthesis Example | Resin (A) | Monomer Composition (weight ratio) | | | | Mw ($\times 10^3$) |
|---|---|---|---|---|---|---|
| 143 | A-48 | ethyl meth- | 94 | itaconic acid | 6 | 7.9 |
| 144 | a-49 | ethyl methacrylate | 95 | 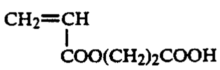 | 5 | 7.7 |
| 145 | A-50 | ethyl methacrylate | 92 | 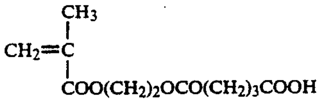 | 8 | 7.6 |
| 146 | A-51 | ethyl methacrylate | 92 | 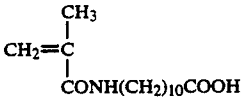 | 8 | 7.8 |
| 147 | A-52 | ethyl methacrylate | 95 | 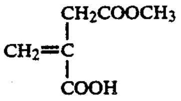 | 5 | 8.0 |
| 148 | A-53 | ethyl methacrylate | 95 | 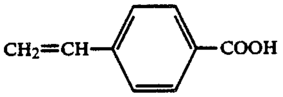 | 5 | 8.2 |
| 149 | A-54 | ethyl methacrylate | 95 | 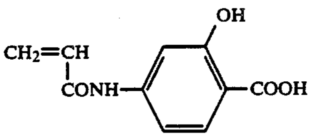 | 5 | 8.0 |
| 150 | A-55 | ethyl methacrylate | 98 | 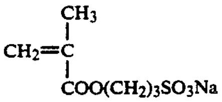 | 2 | 7.6 |
| 151 | A-56 | ethyl methacrylate | 99 | 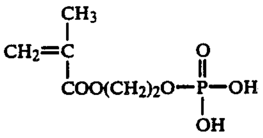 | 1 | 7.8 |
| 152 | A-57 | ethyl methacrylate | 98 | 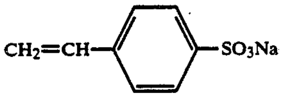 | 2 | 8.0 |
| 153 | A-58 | ethyl methacrylate | 95 | 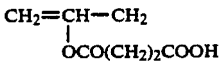 | 5 | 8.3 |
| 154 | A-59 | ethyl methacrylate | 99 | 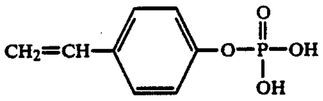 | 1 | 7.7 |
| 155 | A-60 | ethyl methacrylate | 98 | 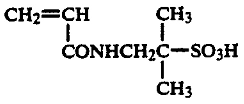 | 2 | 7.6 |
| 156 | A-62 | ethyl methacrylate | 95 | 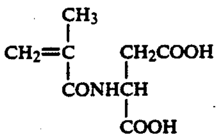 | 5 | 7.5 |

TABLE 19-continued

| Synthesis Example | Resin (A) | Monomer Composition (weight ratio) | | | | Mw ($\times 10^3$) |
|---|---|---|---|---|---|---|
| 157 | A-62 | ethyl methacrylate | 95 | 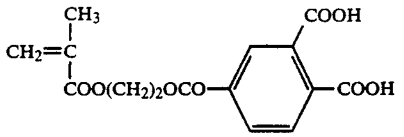 | 5 | 7.9 |

EXAMPLES 57 TO 71

An electrophotographic photoreceptor was prepared in the same manner as in Example 56, except for using 8 g (solid basis) of each of (A-48) to (A-62) synthesized in Synthesis Examples 143 to 157 and 32 g (solid basis) of (B-60) synthesized in Synthesis Example 102.

Each of the resulting photoreceptors was evaluated in the same manner as in Example 46. As a result, surface smoothness and film strength of these samples were found to be substantially equal to those of the sample of Example 56. The electrostatic characteristics (under the condition I) and image forming performance (under the condition II) of the samples are shown in Table 20.

As is apparent from Table 20, each of the photoreceptors according to the present invention was proved excellent in charging properties, dark decay retention, and photosensitivity and provided a clear reproduced image free from background fog even when processed under the severe condition of high temperature and high humidity (30° C., 80% RH).

TABLE 20

| Example No. | Resin (A) | $V_{10}$ (−V) | DRR (%) | $E_{1/10}$ (lux · sec) | Image Forming Properties Under Condition II |
|---|---|---|---|---|---|
| 57 | (A-48) | 550 | 94 | 8.0 | good |
| 58 | (A-49) | 550 | 92 | 7.5 | good |
| 59 | (A-50) | 565 | 95 | 7.0 | good |
| 60 | (A-51) | 555 | 93 | 8.0 | good |
| 61 | (A-52) | 550 | 91 | 8.5 | good |
| 62 | (A-53) | 560 | 95 | 8.0 | good |
| 63 | (A-54) | 565 | 93 | 7.5 | good |
| 64 | (A-55) | 550 | 92 | 8.5 | good |
| 65 | (A-56) | 545 | 94 | 8.0 | good |
| 66 | (A-57) | 550 | 89 | 8.0 | good |
| 67 | (A-58) | 545 | 90 | 8.5 | good |
| 68 | (A-59) | 555 | 94 | 7.5 | good |
| 69 | (A-60) | 555 | 96 | 8.5 | good |
| 70 | (A-61) | 540 | 96 | 9.0 | good |
| 71 | (A-62) | 540 | 95 | 8.0 | good |

EXAMPLE 72

A mixed solution of 48.5 g of ethyl methacrylate, 48.5 g of benzyl methacrylate, 3 g of methacrylic acid, and 200 g of toluene was heated to 105° C. in a nitrogen stream, and 10 g of azobisisobutyronitrile was added thereto to effect reaction for 8 hours.

The resulting copolymer (A-63) had an Mw of 6500 and a Tg of 40° C.

A mixture of 6 g (solid basis) of (A-63), 34 g of (B-60) synthesized in Synthesis Example 102, 200 g of zinc oxide, 0.02 g of a heptamethinecyanine dye (B) having the following formula, 0.05 g of phthalic anhydride, and 300 g of toluene was dispersed in a ball mill for 2 hours to prepare a composition for forming a photoconductive layer. An electrophotographic photoreceptor was prepared in the same manner as in Example 56, except for using the thus prepared composition.

Cyanine Dye (B)

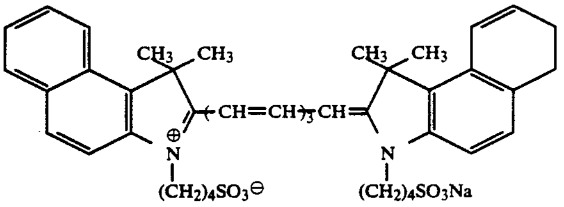

COMPARATIVE EXAMPLE N

A mixed solution of 48.5 g of ethyl methacrylate, 48.5 g of benzyl methacrylate, 3 g of methacrylic acid, and 200 g of toluene was heated to 70° C. in a nitrogen stream, and 10 g of azobisisobutyronitrile was added thereto to effect reaction for 8 hours.

The resulting copolymer (R-6) had an Mw of 36000 and a Tg of 54° C.

An electrophotographic photoreceptor was prepared in the same manner as in Example 72, except for replacing (A-63) and (B-60) with 40 g of (R-6).

Each of the samples obtained in Example 72 and Comparative Example N was evaluated for electrostatic characteristics with a paper analyzer in the same manner as in Example 46, except for using a gallium-aluminum-arsenic semi-conductor laser (oscillation wavelength: 830 nm) as a light source. The results obtained are shown in Table 21.

TABLE 21

| | Example 72 | Comparative Example N |
|---|---|---|
| Surface Smoothness (sec/cc) | 100 | 95 |
| Film Strength (%) | 97 | 89 |
| $V_{10}$ (−V) | 550 | 460 |
| DRR (%) | 90 | 46 |
| $E_{1/10}$ (erg/cm$^2$) | 45 | 56 |

The sample of Comparative Example N had poor surface smoothness and considerably reduced dark decay retention (DRR) (the seemingly small $E_{1/10}$ and high photosensitivity arose from the high DRR), which was even lower than that of the sample of Comparative Example L. These results indicate that the known resin is greatly susceptible to the influence of the sensitizing dye used in combination. To the contrary, the resin of the present invention provides an electrophotographic photoreceptor very excellent in both charging properties and dark decay retention and photosensitivity irrespective of large variations of the chemical structure of the sensitizing dye.

EXAMPLES 73 TO 88

An electrophotographic photoreceptor was prepared in the same manner as in Example 56, except for using each of the resins (A) and the resins (B) shown in Table 22 at a weight ratio of 3:17 in a total amount of 40 g.

Each of the resulting photoreceptors was evaluated for surface smoothness, film strength, and electrostatic characteristics in the same manner as in Example 56. As a result, any of the samples was proved satisfactory in film strength and electrostatic characteristics and provided a clear reproduced image free from background fog even when processed under a high temperature and high humidity condition (30° C., 80% RH).

TABLE 22

| Example No. | Resin (A) | Resin (B) |
|---|---|---|
| 73 | (A-48) | (B-61) |
| 74 | (A-49) | (B-630 |
| 75 | (A-50) | (B-64) |
| 76 | (A-51) | (B-66) |
| 77 | (A-54) | (B-67) |
| 78 | (A-54) | (B-68) |
| 79 | (A-54) | (B-69) |
| 80 | (A-54) | (B-74) |
| 81 | (A-55) | (B-94) |
| 82 | (A-55) | (B-80) |
| 83 | (A-56) | (B-96) |
| 84 | (A-56) | (B-81) |
| 85 | (A-56) | (B-84) |
| 86 | (A-57) | (B-98) |
| 87 | (A-57) | (B-99) |
| 88 | (A-57) | (B-100) |

As described above, the present invention provides an electrophotographic photoreceptor exhibiting superior performance properties such as surface smoothness, film strength, electrostatic characteristics, and image forming performance, and, when processed into a lithographic printing plate, excellent printing properties such as background stain resistance and printing durability.

Further, the electrophotographic photoreceptor according to the present invention retains its superior characteristics such as surface smoothness and electrostatic characteristics even when combined with various kinds of sensitizing dyes.

While the invention has been described in detail and with reference to specific embodiments thereof, it will be apparent to one skilled in the art that various changes and modifications can be made therein without departing from the spirit and scope thereof.

What is claimed is:

1. An electrophotographic photoreceptor comprising a support having provided thereon at least one photoconductive layer containing at least inorganic photoconductive particles and a binder resin, wherein said binder resin comprising at least one resin (A) having a weight average molecular weight of from $1\times10^3$ to $2\times10^4$ and containing at least one polar group selected from $-PO_3H_2$, $-SO_3H$, $-COOH$,

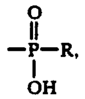

wherein R represents a hydrocarbon group or —OR'; and R' represents a hydrocarbon group, and a cyclic acid anhydride-containing group, and at least one resin (B) not containing the polar group(s) containing in resin (A) and having a weight average molecular weight of $5\times10^4$ or more and containing a cross-linked structure.

2. An electrophotographic photoreceptor as claimed in claim 1, wherein said resin (A) contains not less than 30% by weight of a copolymerization component represented by formula (I):

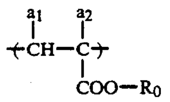

(I)

wherein $a_1$ and $a_2$, which may be the same or different each represents a hydrogen atom, a halogen atom, a group, or a hydrocarbon group; and $R_0$ represents a carbon group.

3. An electrophotographic photoreceptor claimed in claim 2, wherein said copolymerization component represented by formula (I) is represented by formula (II) or (III):

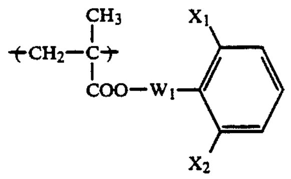

(II)

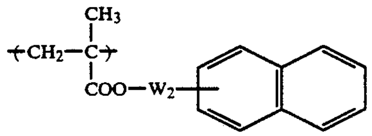

(III)

wherein $X_1$ and $X_2$ each represents a hydrogen atom hydrocarbon group having from 1 to 10 carbon a chlorine atom, a bromine atom, $-COY_1$ or $-COOY_2$, $Y_1$ and $Y_2$ each represents a hydrocarbon group from 1 to 10 carbon atoms, provided that both $X_2$ do not simultaneously represent a hydrogen and $W_1$ and $W_2$ each represents a mere bond or a linking group containing from 1 to 4 linking atoms which connects —COO— and the benzene ring.

4. An electrophotographic photoreceptor as claimed in claim 1, wherein said resin (B) is a resin containing, as a copolymerization component, a repeating unit represented by formula (IV):

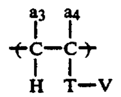

(IV)

wherein T represents —COO—, —OCO—, $-CH_2OCO-$, $-CH_2COO-$, —O—, or $-SO_2-$; V represents a hydrocarbon group having from 1 to 22 carbon atoms; and $a_3$ and $a_4$, which may be the same or different, each represents a hydrogen atom, a halogen atom, a cyano group, a hydrocarbon group having from 1 to 8 carbon atoms, —COO—Z, or —COO—Z bonded via a hydrocarbon group having from 1 to 8 carbon atoms, wherein Z represents a hydrocarbon group having from 1 to 18 carbon atoms.

5. An electrophotographic photoreceptor as claimed in claim 1, wherein said resin (B) is a resin having bonded to only one of terminals of at least one polymer main chain thereof at least one polar group selected from $-PO_3H_2$, $-SO_3H$, $-COOH$,

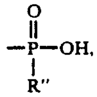

wherein R″ represents a hydrocarbon group or —OR‴ (wherein R‴ represents a hydrocarbon group), and a cyclic acid anhydride-containing group.

6. An electrophotographic photoreceptor as claimed in claim 5, wherein said resin (B) is a resin which does not contain, as a polymerization component, a repeating unit containing the polar group present in the resin (A).

7. An electrophotographic photoreceptor as claimed in claim 1, wherein said inorganic photoconductive particles are zinc oxide particles.

8. An electrophotographic photoreceptor as claimed in claim 1, wherein the polar group-containing copolymerization component in resin (A) is present in an amount of 0.5 to 15% by weight.

9. An electrophotographic photoreceptor as claimed in claim 1, wherein resin (B) has a weight average molecular weight of from $5\times10^4$ to $1\times10^6$.

10. An electrophotographic photoreceptor as claimed in claim 1, wherein the weight of resin (A) to resin (B) is 5 to 80:95 to 20.

* * * * *